United States Patent
Wakazono et al.

(10) Patent No.: US 7,929,222 B2
(45) Date of Patent: Apr. 19, 2011

(54) ZOOM LENS SYSTEM AND CAMERA INCLUDING THE SAME

(75) Inventors: Tsuyoshi Wakazono, Utsunomiya (JP); Ryuji Nurishi, Utsunomiya (JP); Masaru Sakamoto, Utsunomiya (JP); Masakazu Kodaira, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 12/467,956

(22) Filed: May 18, 2009

(65) Prior Publication Data
US 2009/0290230 A1  Nov. 26, 2009

(30) Foreign Application Priority Data

May 21, 2008  (JP) .................................. 2008-132926

(51) Int. Cl.
*G02B 9/36* (2006.01)
(52) U.S. Cl. ...................................................... 359/775
(58) Field of Classification Search .................. 359/688, 359/735, 775
See application file for complete search history.

(56) References Cited

U.S. PATENT DOCUMENTS

| | | | |
|---|---|---|---|
| 4,927,250 A | 5/1990 | Suda | |
| 5,677,792 A | 10/1997 | Hamano | |
| 6,002,528 A * | 12/1999 | Tomita | 359/684 |
| 6,035,145 A | 3/2000 | Kanai | |

FOREIGN PATENT DOCUMENTS

| | | |
|---|---|---|
| JP | 61-223819 A | 10/1986 |
| JP | 07-104218 A | 4/1995 |
| JP | 08-015648 A | 1/1996 |
| JP | 09-033812 A | 2/1997 |
| JP | 11-101941 A | 4/1999 |
| JP | 2001-021804 A | 1/2001 |

* cited by examiner

*Primary Examiner* — Joseph Martinez
(74) *Attorney, Agent, or Firm* — Canon USA, Inc. IP Division

(57) ABSTRACT

A zoom lens system includes four lens units each having positive, negative, negative and positive refractive powers in the stated order from an object side to an image side. A first lens unit includes a variable apex angle prism on the image side of at least one lens element. In this zoom lens system, a focal length of the first lens unit and imaging magnifications of a second lens unit and a fourth lens unit are set appropriately so as to suppress occurrence of decentering aberration accompanying a variation of a prism apex angle.

9 Claims, 30 Drawing Sheets

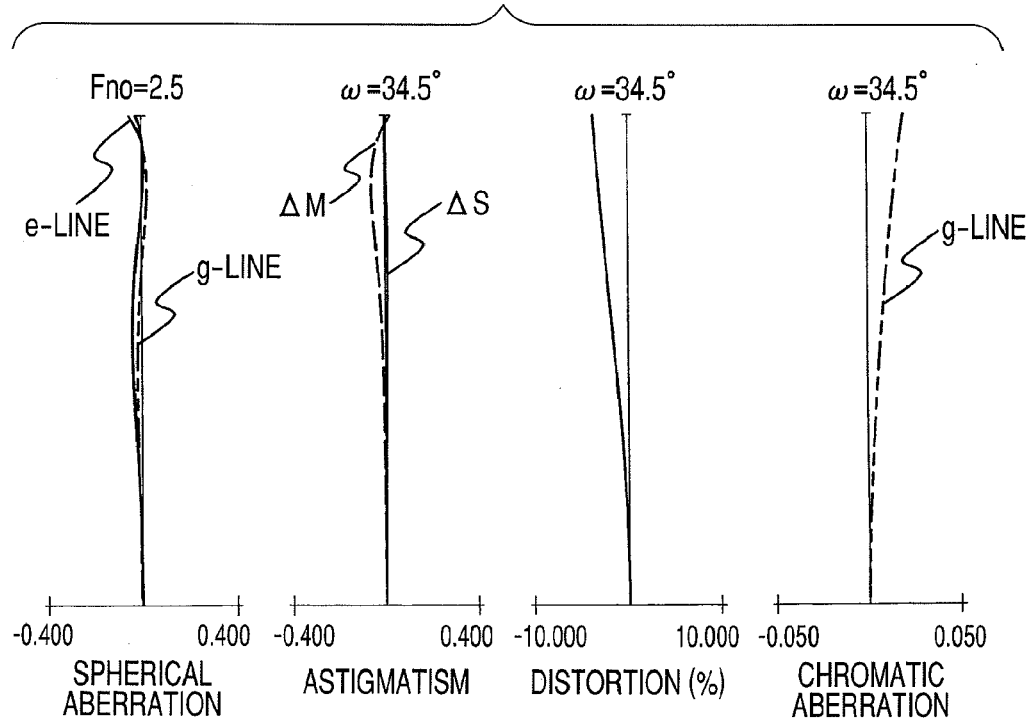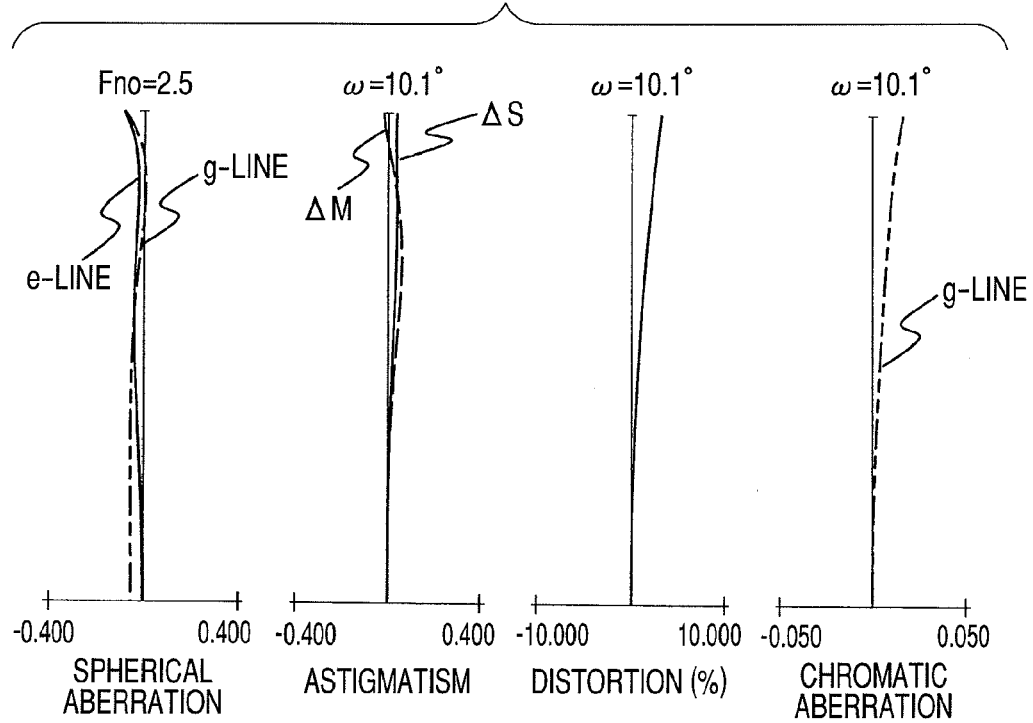

ZOOM LENS SYSTEM AND CAMERA INCLUDING THE SAME

BACKGROUND OF THE INVENTION

1. Field of the Invention

The present invention relates to a zoom lens system and a camera including the same.

2. Description of the Related Art

In an image pickup optical system (a shooting optical system) used in a camera such as a TV camera, a digital still camera, and a video camera, a small and lightweight zoom lens system which has a large aperture, a wide field angle, a high zoom ratio, and high optical performance over an entire zoom range and an entire object distance range is demanded.

In addition, a zoom lens system having an image stabilization function of reducing (compensating for) shot image blurring caused from a shake when shooting by a camera carried on a shoulder or a vibration when shooting by a camera mounted on a vehicle or the like is demanded.

Conventionally, there is known a zoom lens system having the image stabilization function of compensating for the shot image blurring. A variable apex angle prism having a variable prism apex angle is disposed in an optical path of the zoom lens system. When the zoom lens system oscillates, the prism apex angle is changed according to the oscillation for compensating for the shot image blurring (see Japanese Patent Application Laid-Open No. S61-223819 (corresponding to U.S. Pat. No. 4,927,250), Japanese Patent Application Laid-Open No. S11-101941, Japanese Patent Application Laid-Open No. H07-104218 (corresponding to U.S. Pat. No. 5,677,792), and Japanese Patent Application Laid-Open No. H08-015648).

In general, if the method of changing the prism apex angle of the variable apex angle prism for compensating for the shot image blurring is used, a decentering aberration occurs in the zoom lens system by the variation of the prism apex angle when the image stabilization function is activated. Therefore, image quality is apt to deteriorate when the image stabilization function is activated.

There is known a paper about the decentering aberration caused by the image stabilization function, which is handled based on an aberration theory (Optical Society of Japan, Nineteenth Optical Symposium Proceedings, Lecture No. 17).

In general, the method of changing the prism apex angle of the variable apex angle prism for compensating for the shot image blurring has a merit that the shot image blurring can be compensated relatively quickly and easily even if the vibration and the shot image blurring are large.

However, there is a tendency that a decentering aberration may frequently occur corresponding to the variation of the prism apex angle of the variable apex angle prism, and hence the image quality deteriorates significantly. Therefore, it is important to set appropriately a structure of the variable apex angle prism and a position of the variable apex angle prism in the optical path, in particular, structure of lens units disposed before and after the variable apex angle prism, in order that the image stabilization is performed quickly and that the decentering aberration generated in the image stabilization process is reduced.

If those structures are not appropriate, a decentering aberration may frequently occur when the image stabilization function is activated, and hence image quality deteriorates significantly when the image stabilization function is activated.

SUMMARY OF THE INVENTION

It is an object of the present invention to provide a zoom lens system capable of suppressing the decentering aberration caused by the variation of the prism apex angle when the variable apex angle prism is used for performing the image stabilization so that a high quality image can be obtained even when the image stabilization function is activated.

An exemplary zoom lens system according to the present invention includes: a first lens unit that does not move for zooming and has a positive optical power; a second lens unit that moves during the zooming and has a negative optical power; a third lens unit that moves during the zooming and has a negative optical power; and a fourth lens unit that does not move for the zooming and has a positive optical power in the stated order from an object side to an image side. In addition, the first lens unit includes a variable apex angle prism disposed on the image side of at least one lens element. In this zoom lens system, a focal length of the first lens unit and imaging magnifications of the second lens unit and the fourth lens unit are set appropriately.

Further features of the present invention become apparent from the following description of exemplary embodiments with reference to the attached drawings.

BRIEF DESCRIPTION OF THE DRAWINGS

FIGS. 2A, 2B and 2C are longitudinal aberration charts at the wide angle end, at a middle zoom position, and at a telephoto end for an infinite object according to Embodiment 1 of the present invention.

DESCRIPTION OF THE EMBODIMENTS

Hereinafter, embodiments of the present invention are described in detail with reference to the attached drawings.

The zoom lens system according to the present invention includes a first lens unit, a second lens unit, a third lens unit, and a fourth lens unit in this order from the object side to the image side. The first lens unit does not move for zooming and has a positive refractive power (corresponding to the optical power which is an inverse number of a focal length). The second lens unit has a negative refractive power and moves during zooming. The third lens unit has a negative refractive power and moves during zooming. Here, the third lens unit moves in the optical axis direction so as to compensate for a variation of the position of image plane accompanying the zooming operation. The fourth lens unit does not move for zooming and has a positive refractive power.

The first lens unit includes a variable apex angle prism having a variable prism apex angle disposed on the image side of at least one lens element.

Here, the lens element means a single lens.

The first lens unit includes a front subunit that has a negative refractive power and does not move for focusing, a middle subunit that has a positive refractive power and moves during focusing, and a rear subunit that has a positive refractive power and does not move for focusing, which are disposed in this order from the object side to the image side.

The variable apex angle prism is disposed between the middle subunit and the rear subunit or in the rear subunit, and accordingly it is disposed on the image side of at least one lens element in the first lens unit.

Figure 1:
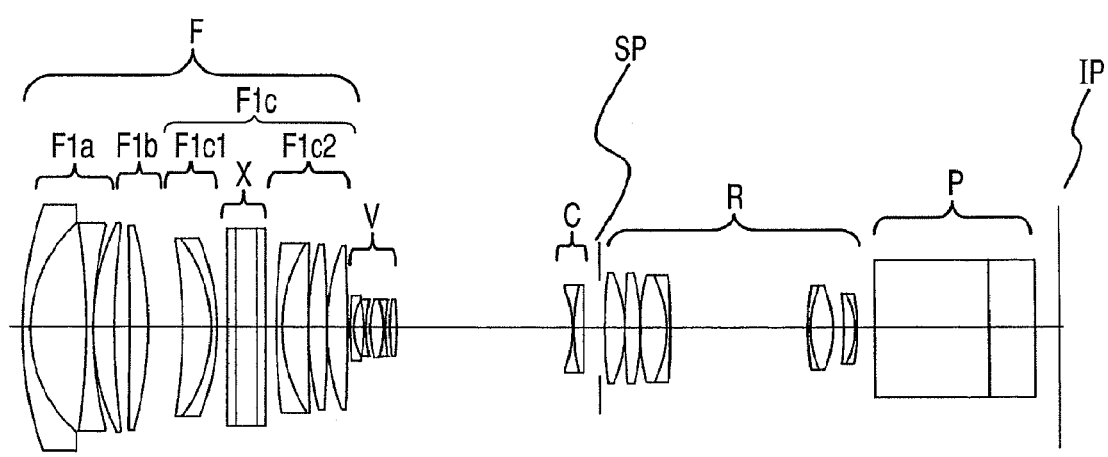
FIG. 1 is a lens cross section at a wide angle end according to Embodiment 1 of the present invention.

FIG. 1 is a lens cross section at a wide angle end according to Embodiment 1 of the present invention.

Figure 2C:
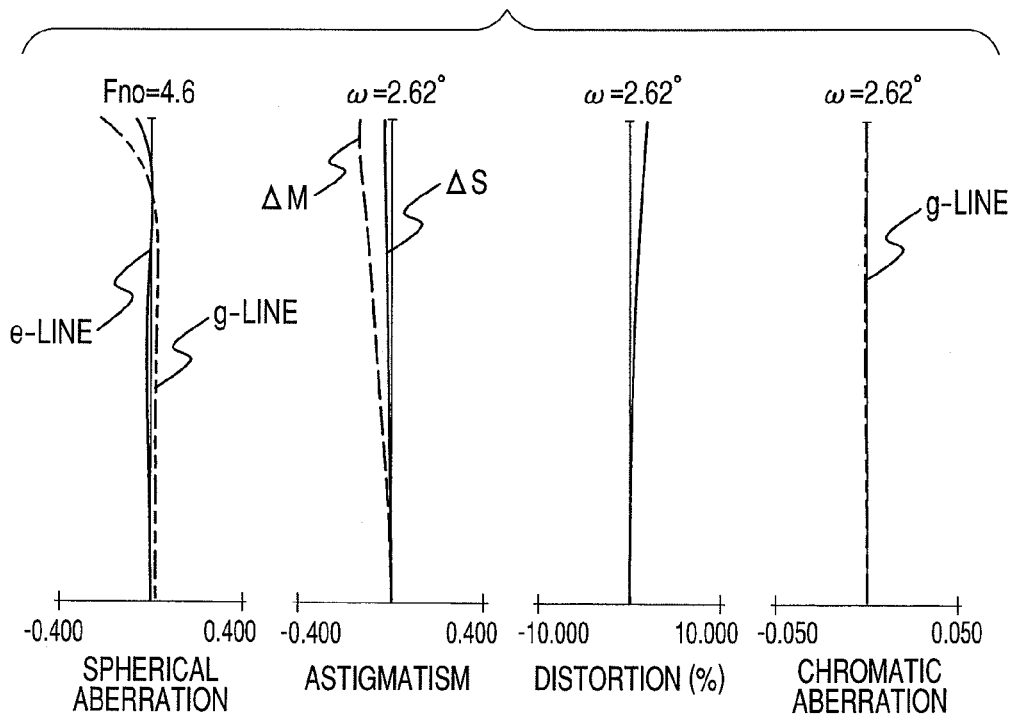

FIGS. 2A, 2B and 2C are longitudinal aberration charts at the wide angle end (f=8 mm), at a middle zoom position (f=30.98 mm), and at a telephoto end (f=120 mm) for an infinite object according to Embodiment 1 of the present invention.

Figure 3:
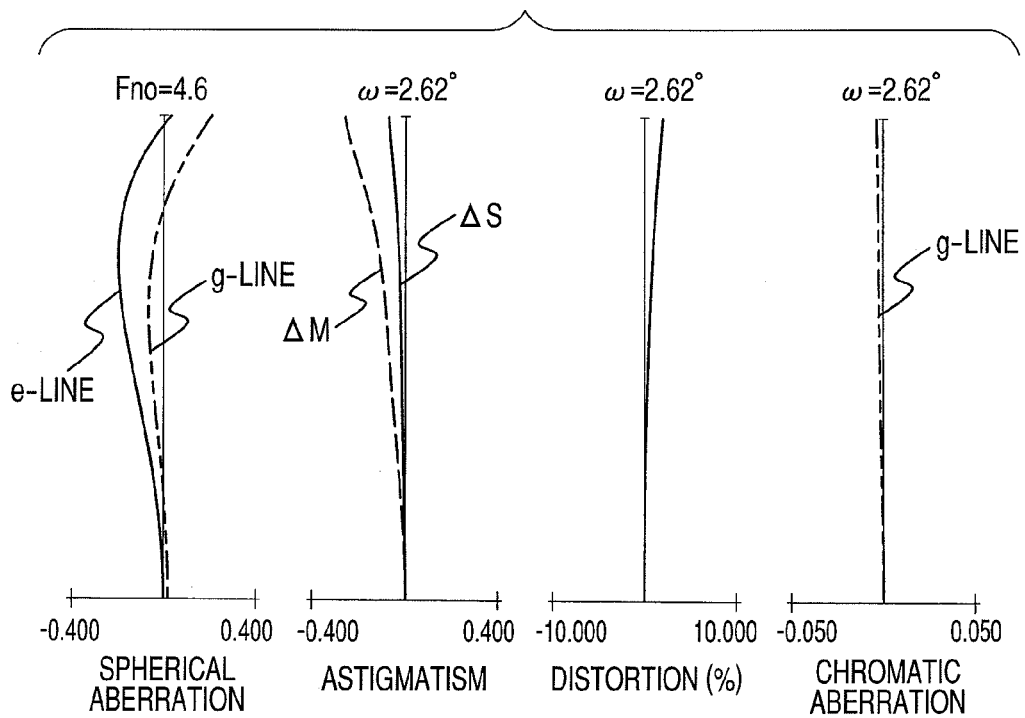
FIG. 3 is a longitudinal aberration chart at the telephoto end for an object in close proximity according to Embodiment 1 of the present invention.

FIG. 3 is a longitudinal aberration chart at the telephoto end (f=120 mm) for an object in close proximity (0.8 m) according to Embodiment 1 of the present invention.

Figure 4A:
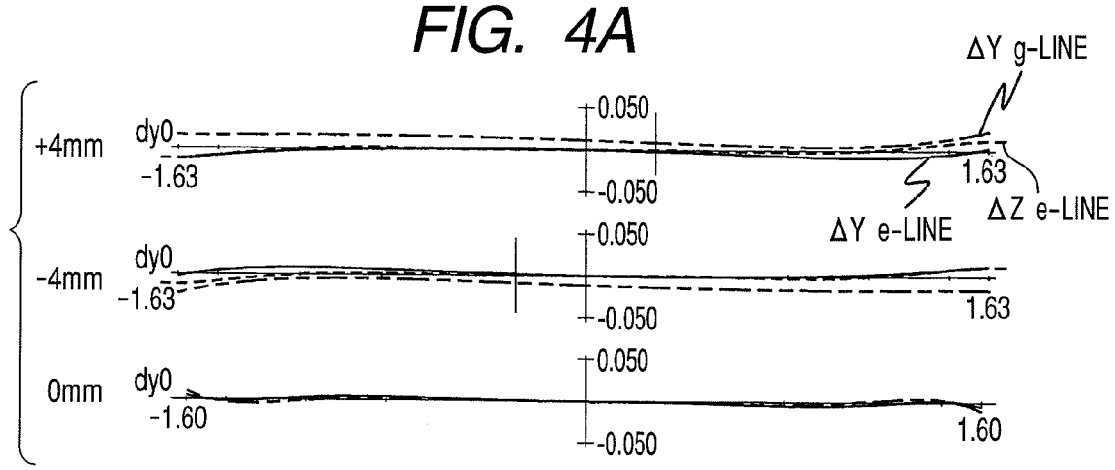
FIGS. 4A, 4B and 4C are lateral aberration charts at the wide angle end, at the middle zoom position, and at the telephoto end for the infinite object according to Embodiment 1 of the present invention.
Figure 4B:
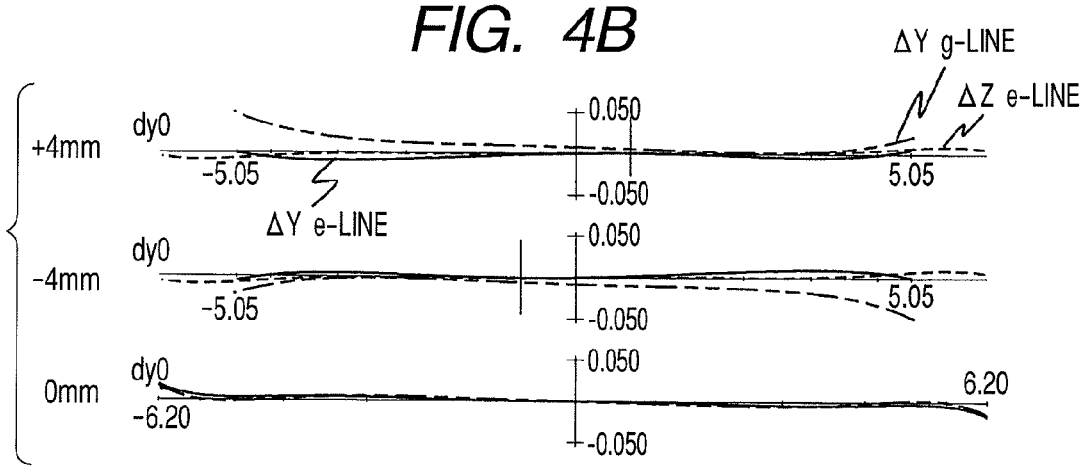
Figure 4C:
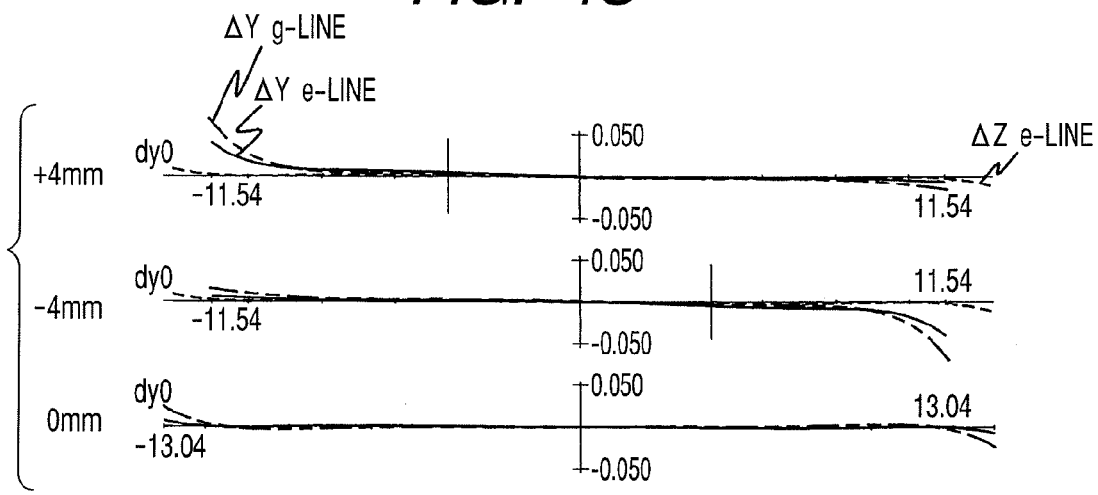

FIGS. 4A, 4B and 4C are lateral aberration charts at the wide angle end (f=8 mm), at the middle zoom position (f=30.98 mm), and at the telephoto end (f=120 mm) for the infinite object according to Embodiment 1 of the present invention.

Figure 5:
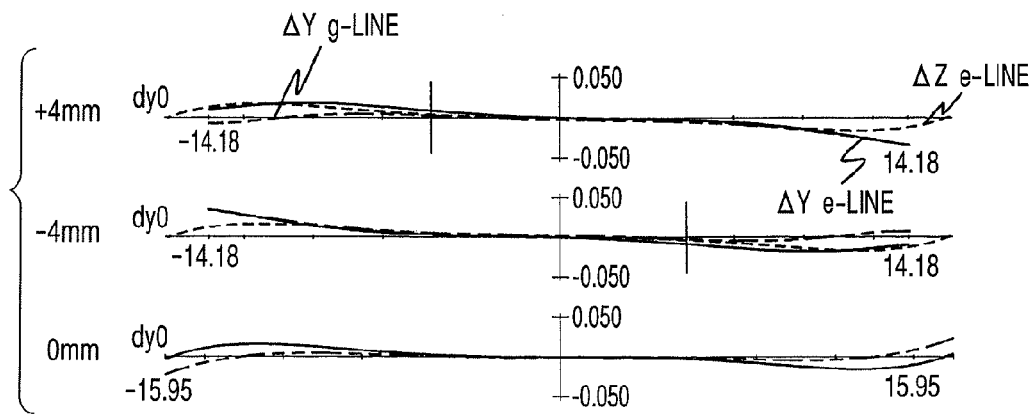
FIG. 5 is a lateral aberration chart at the telephoto end for the object in close proximity according to Embodiment 1 of the present invention.

FIG. 5 is a lateral aberration chart at the telephoto end (f=120 mm) for the object in close proximity (0.8 m) according to Embodiment 1 of the present invention.

Figure 6A:
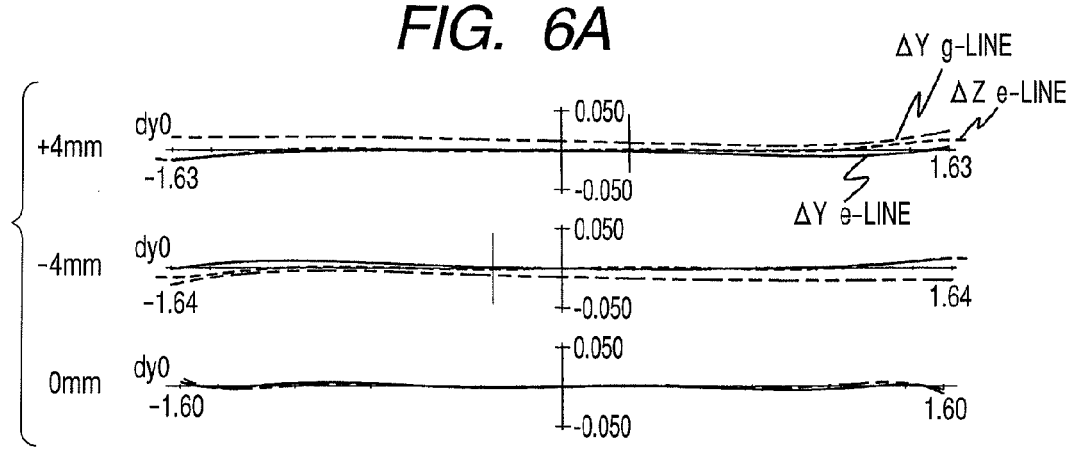
FIGS. 6A, 6B and 6C are lateral aberration charts at the wide angle end, at the middle zoom position, and at the telephoto end for the infinite object when a prism apex angle of a variable apex angle prism is 0.3 degrees according to Embodiment 1 of the present invention.
Figure 6B:
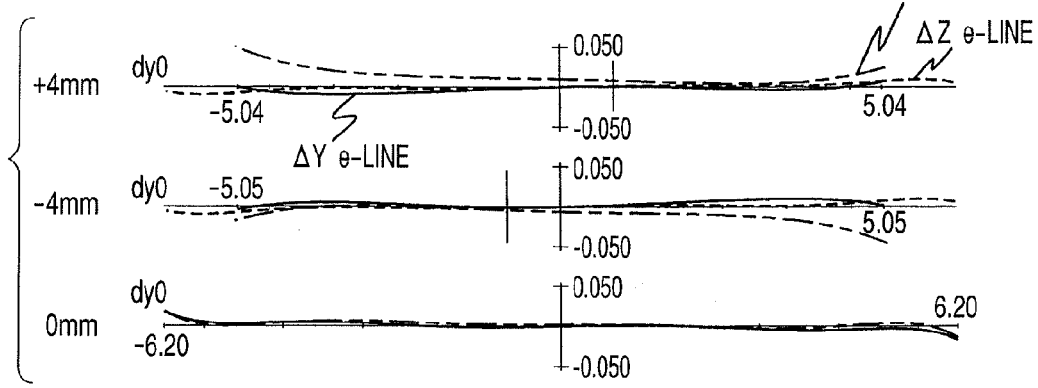
Figure 6C:
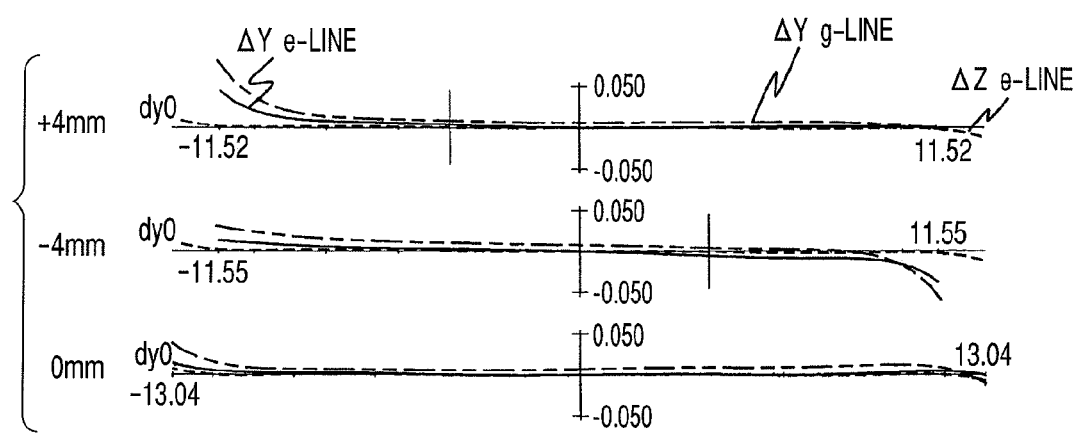

FIGS. 6A, 6B and 6C are lateral aberration charts at the wide angle end (f=8 mm), at the middle zoom position (f=30.98 mm), and at the telephoto end (f=120 mm) when the prism apex angle of the variable apex angle prism is 0.3 degrees according to Embodiment 1 of the present invention.

Figure 7:
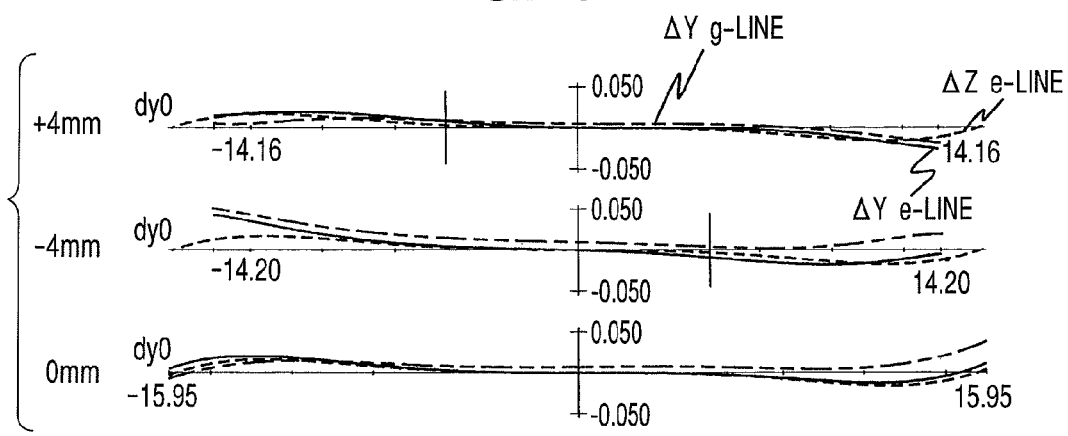
FIG. 7 is a lateral aberration chart at the telephoto end for the object in close proximity when the prism apex angle of the variable apex angle prism is 0.3 degrees according to Embodiment 1 of the present invention.

FIG. 7 is a lateral aberration chart at the telephoto end (f=120 mm) for the object in close proximity (0.8 m) when the prism apex angle of the variable apex angle prism is 0.3 degrees according to Embodiment 1 of the present invention.

Figure 8:
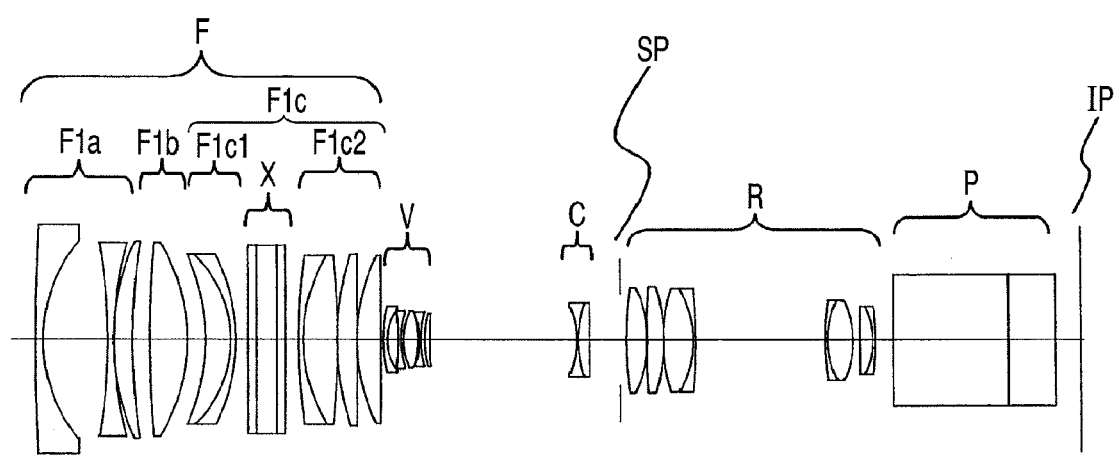
FIG. 8 is a lens cross section at a wide angle end according to Embodiment 2 of the present invention.

FIG. 8 is a lens cross section at a wide angle end according to Embodiment 2 of the present invention.

Figure 9A:
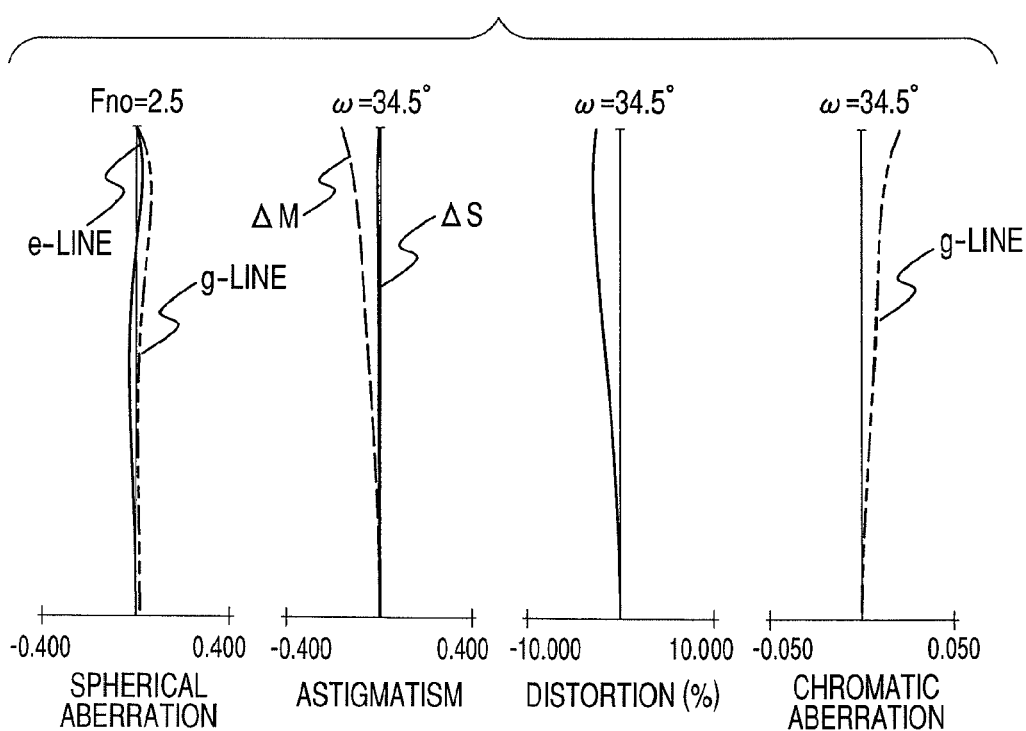
FIGS. 9A, 9B and 9C are longitudinal aberration charts at the wide angle end, at a middle zoom position, and at a telephoto end for an infinite object according to Embodiment 2 of the present invention.
Figure 9B:
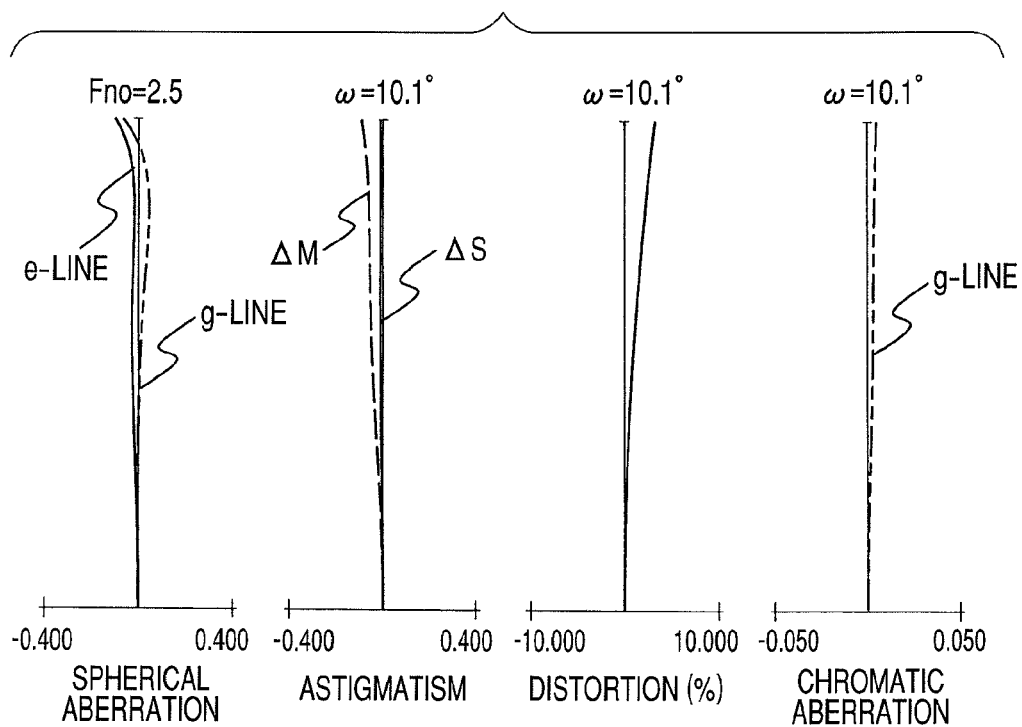
Figure 9C:
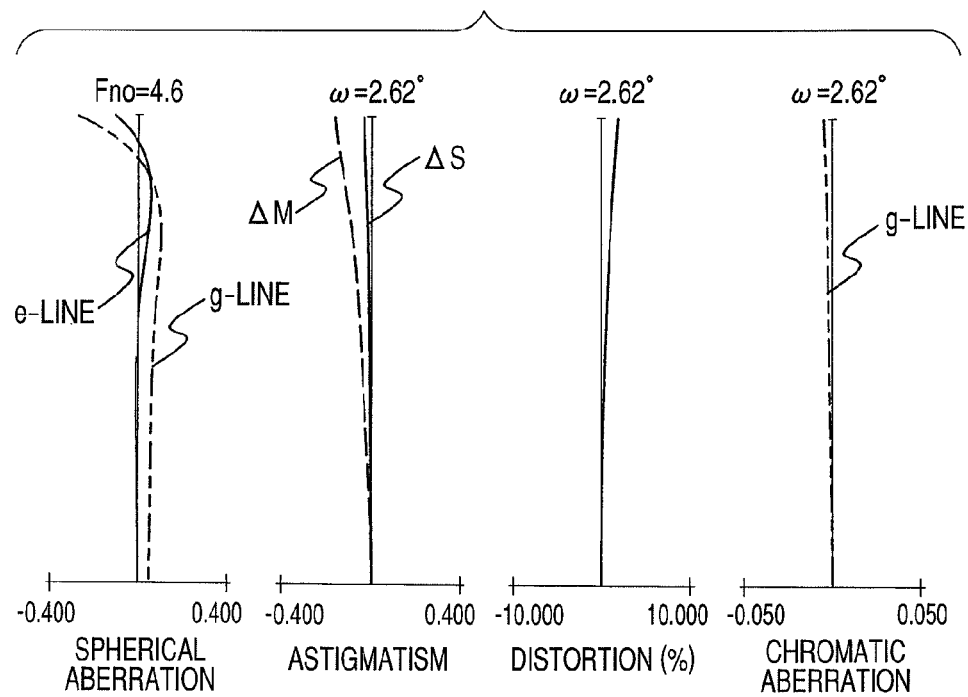

FIGS. 9A, 9B and 9C are longitudinal aberration charts at the wide angle end (f=8 mm), at a middle zoom position (f=30.98 mm), and at a telephoto end (f=120 mm) for an infinite object according to Embodiment 2 of the present invention.

Figure 10:
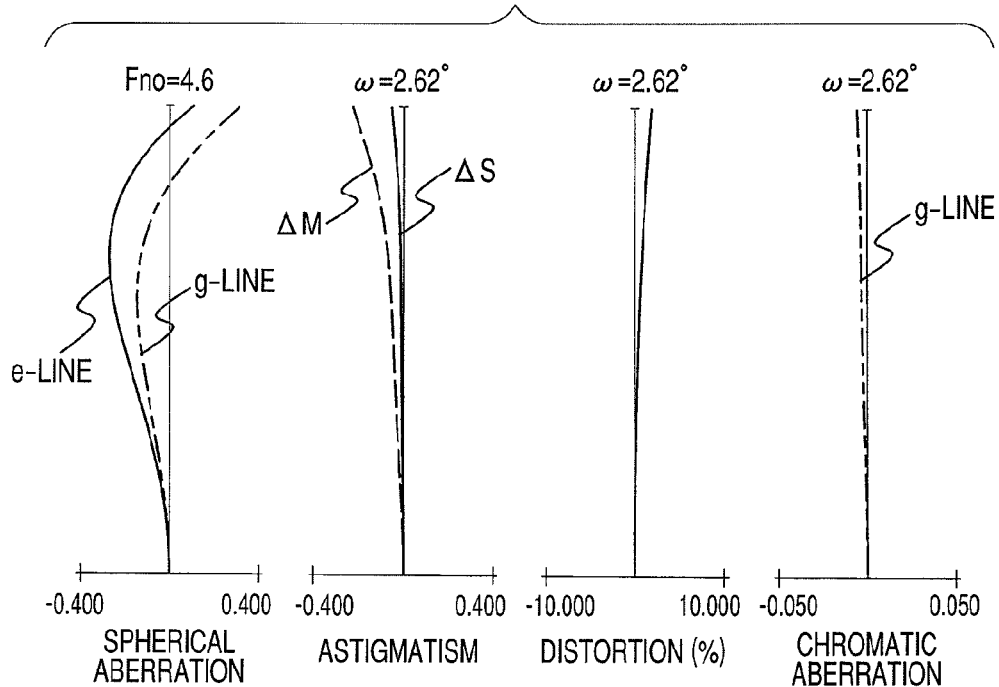
FIG. 10 is a longitudinal aberration chart at the telephoto end for an object in close proximity according to Embodiment 2 of the present invention.

FIG. 10 is a longitudinal aberration chart at the telephoto end (f=120 mm) for an object in close proximity (0.8 m) according to Embodiment 2 of the present invention.

Figure 11A:
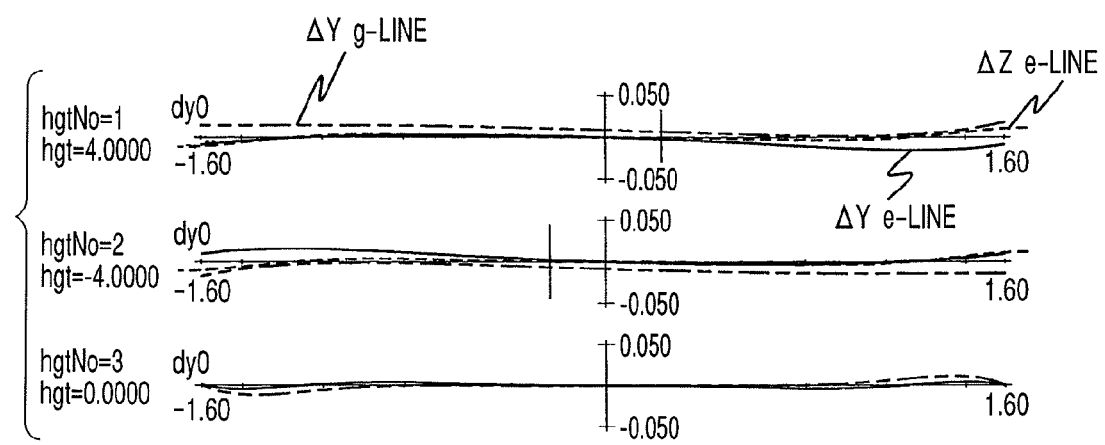
FIGS. 11A, 11B and 11C are lateral aberration charts at the wide angle end, at the middle zoom position, and at the telephoto end for the infinite object according to Embodiment 2 of the present invention.
Figure 11B:
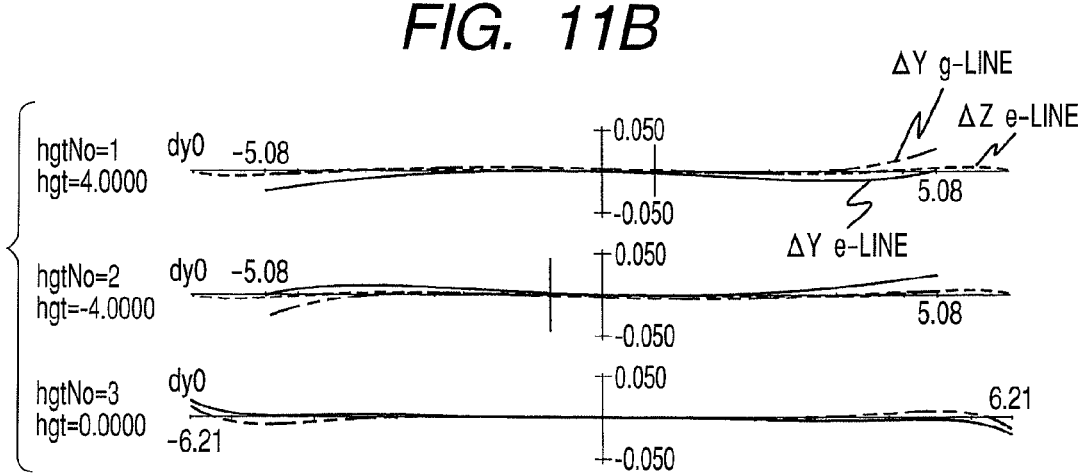
Figure 11C:
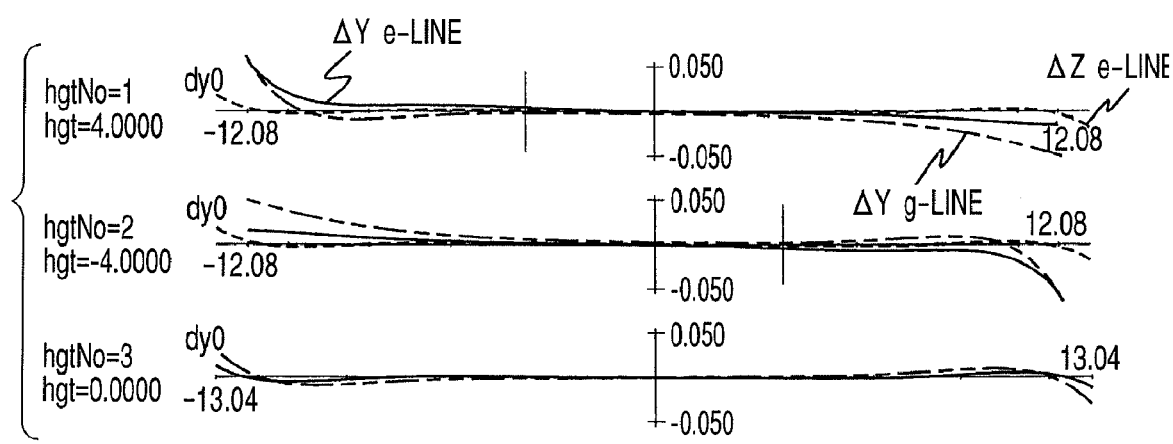

FIGS. 11A, 11B and 11C are lateral aberration charts at the wide angle end (f=8 mm), at the middle zoom position (f=30.98 mm), and at the telephoto end (f=120 mm) for the infinite object according to Embodiment 2 of the present invention.

Figure 12:
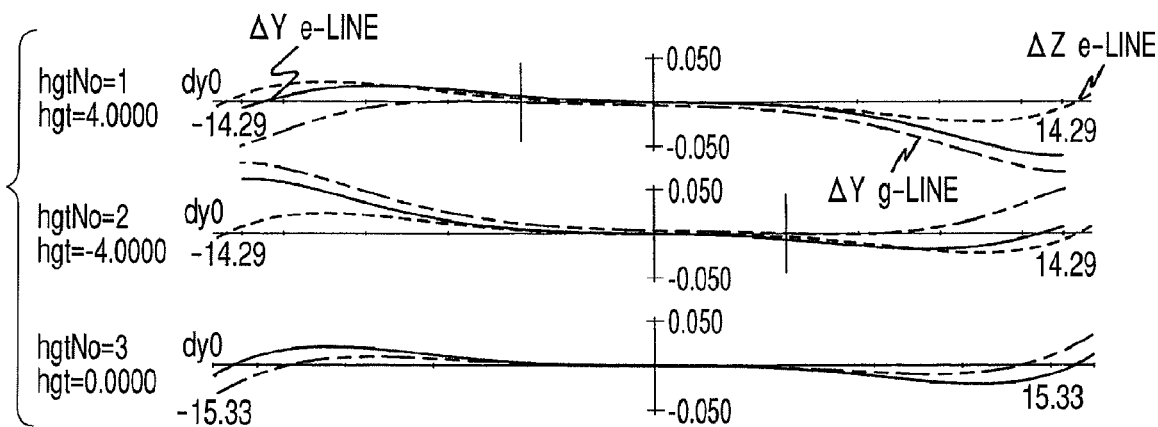
FIG. 12 is a lateral aberration chart at the telephoto end for the object in close proximity according to Embodiment 2 of the present invention.

FIG. 12 is a lateral aberration chart at the telephoto end (f=120 mm) for the object in close proximity (0.8 m) according to Embodiment 2 of the present invention.

Figure 13A:
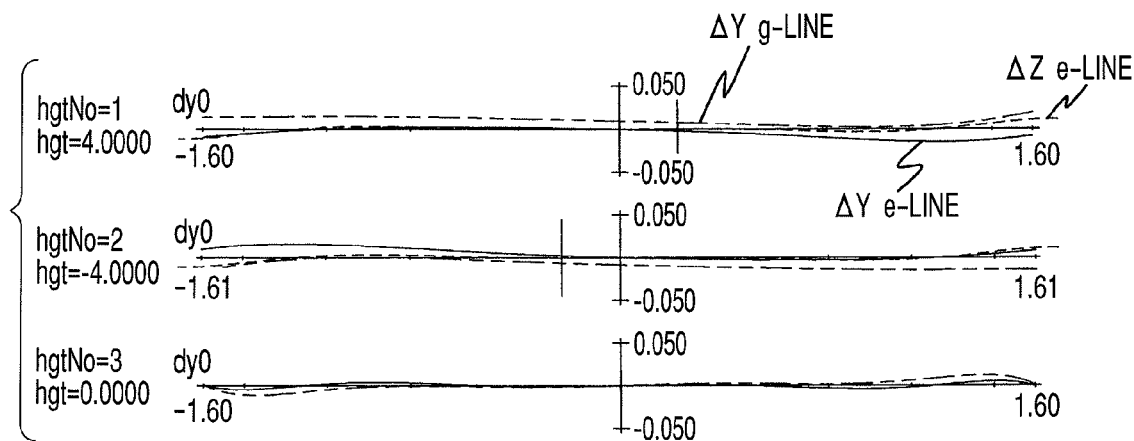
FIGS. 13A, 13B and 13C are lateral aberration charts at the wide angle end, at the middle zoom position, and at the telephoto end for the infinite object when a prism apex angle of a variable apex angle prism is 0.28 degrees according to Embodiment 2 of the present invention.
Figure 13B:
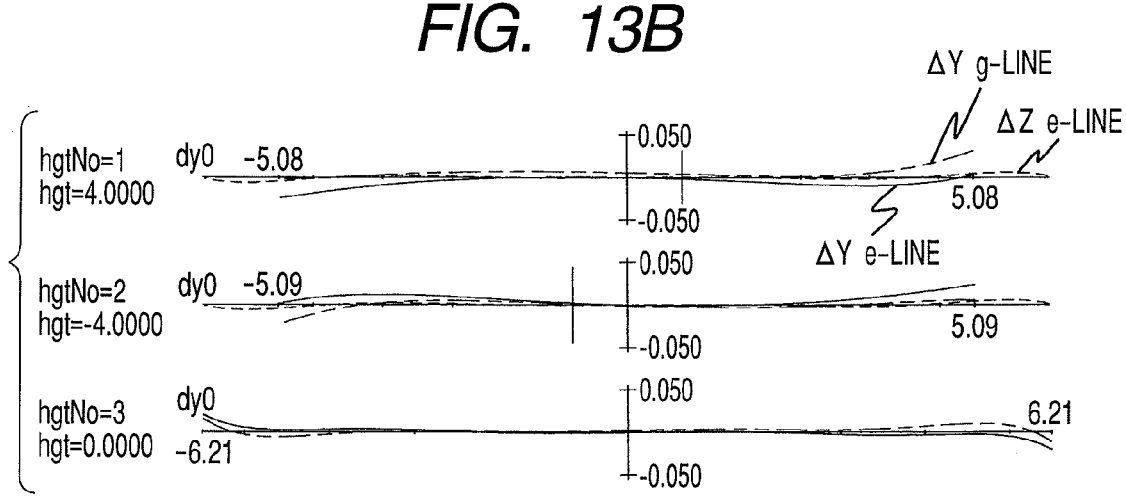
Figure 13C:
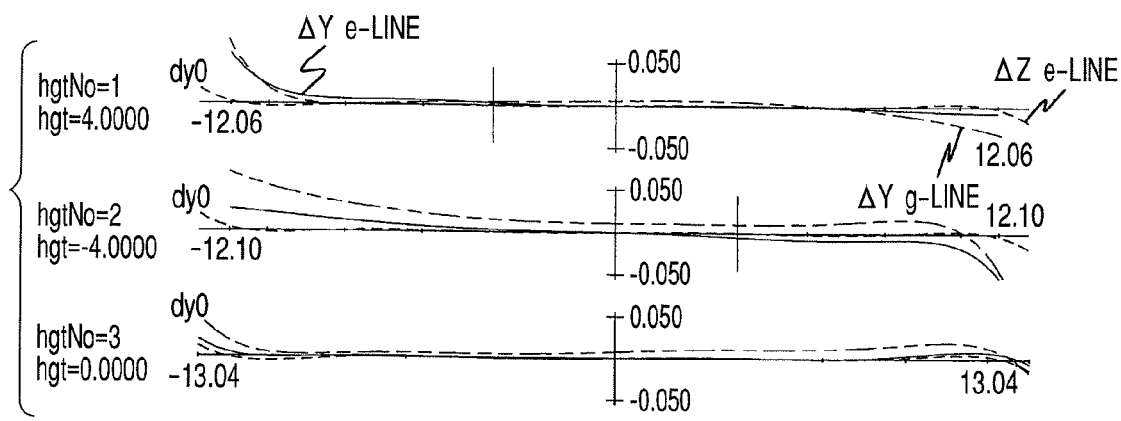

FIGS. 13A, 13B and 13C are lateral aberration charts at the wide angle end (f=8 mm), at the middle zoom position (f=30.98 mm), and at the telephoto end (f=120 mm) when the prism apex angle of the variable apex angle prism is 0.28 degrees according to Embodiment 2 of the present invention.

Figure 14:
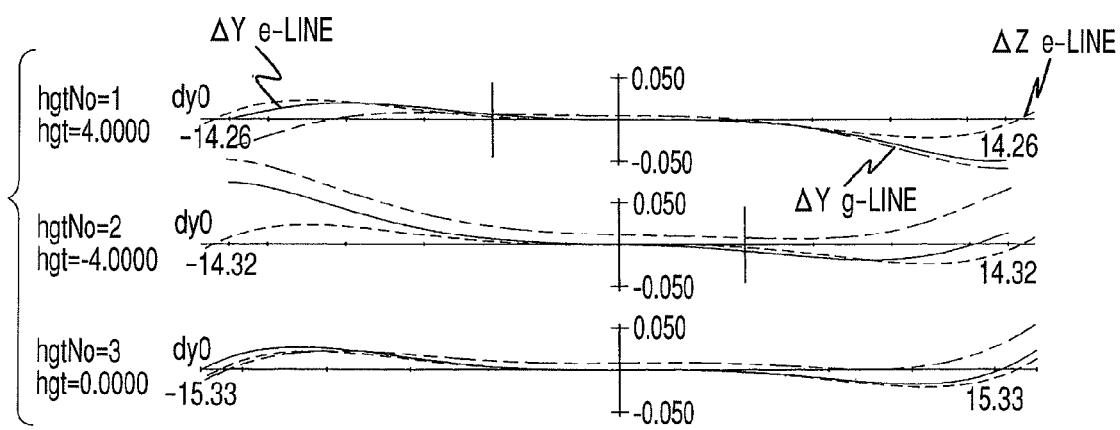
FIG. 14 is a lateral aberration chart at the telephoto end for the object in close proximity when the prism apex angle of the variable apex angle prism is 0.28 degrees according to Embodiment 2 of the present invention.

FIG. 14 is a lateral aberration chart at the telephoto end (f=120 mm) for the object in close proximity (0.8 m) when the prism apex angle of the variable apex angle prism is 0.28 degrees according to Embodiment 2 of the present invention.

Figure 15:
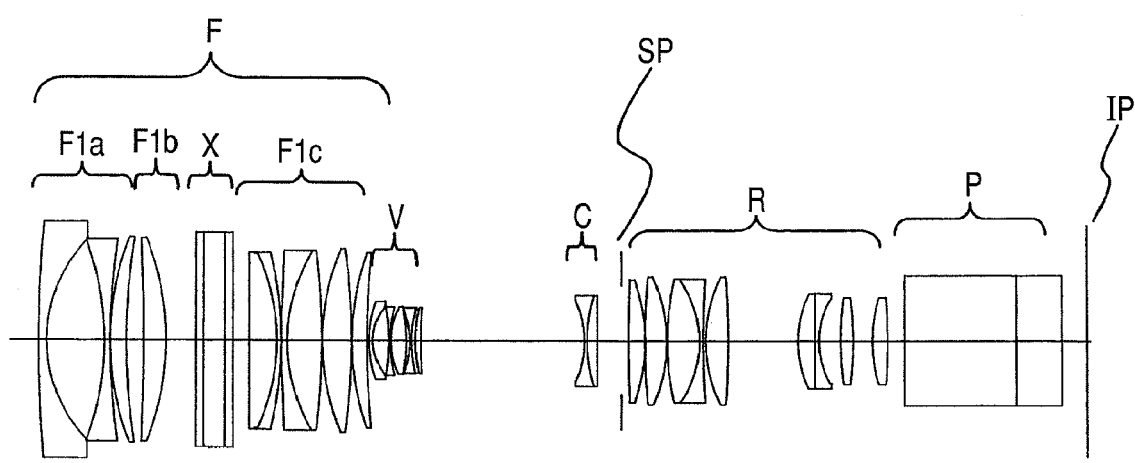
FIG. 15 is a lens cross section at a wide angle end according to Embodiment 3 of the present invention.

FIG. 15 is a lens cross section at a wide angle end according to Embodiment 3 of the present invention.

Figure 16A:
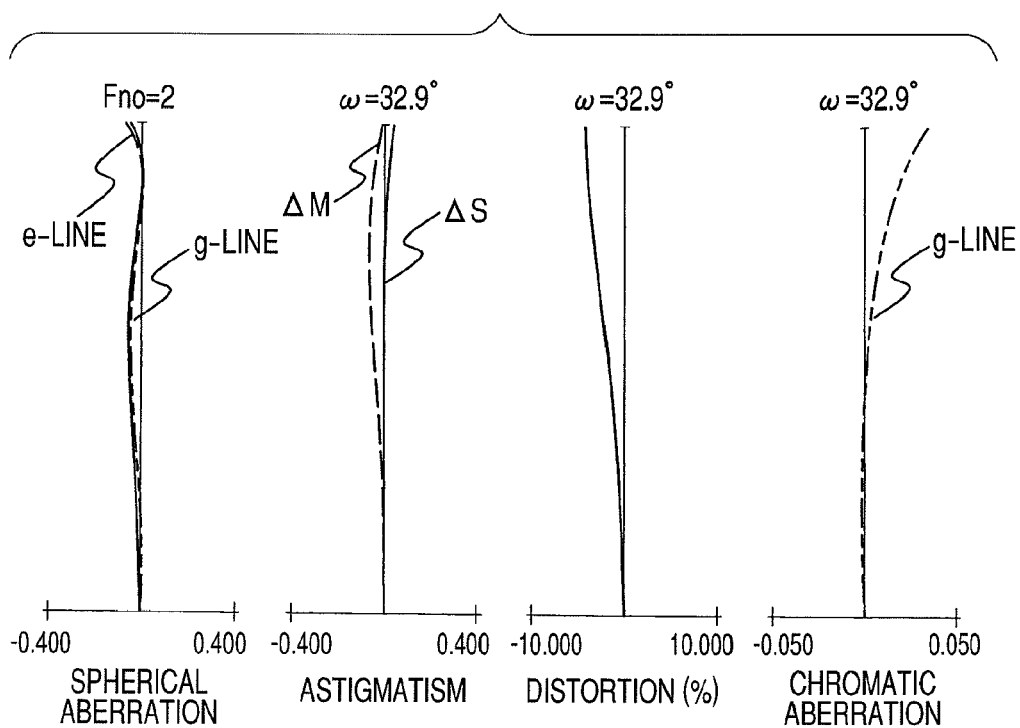
FIGS. 16A, 16B and 16C are longitudinal aberration charts at the wide angle end, at a middle zoom position, and at a telephoto end for an infinite object according to Embodiment 3 of the present invention.
Figure 16B:
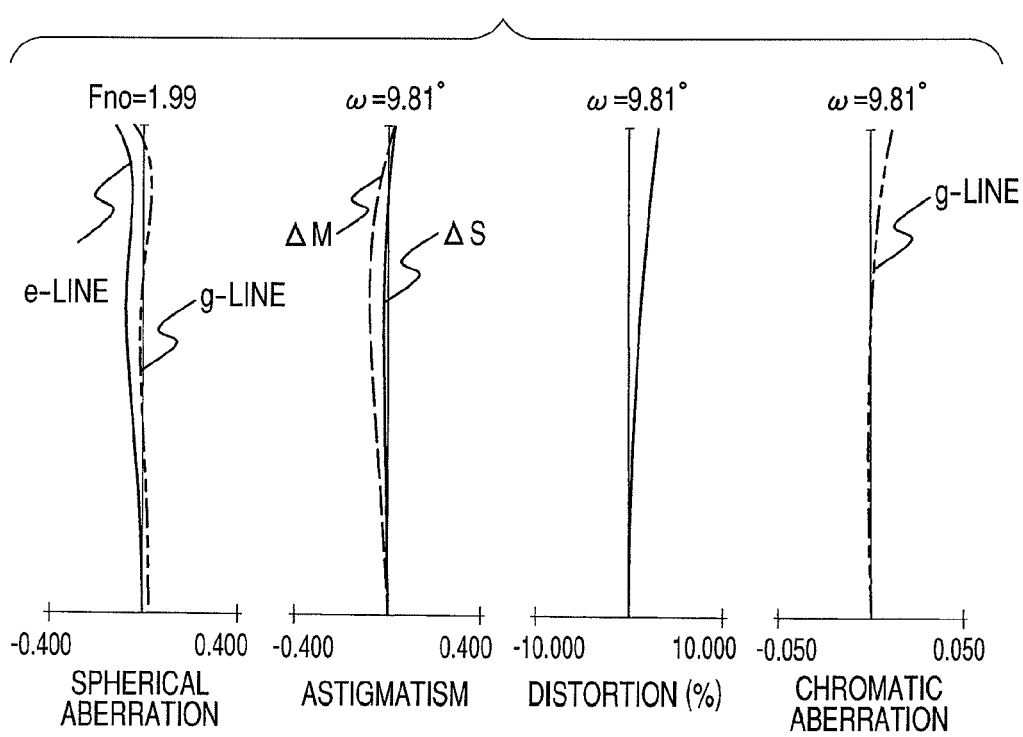
Figure 16C:
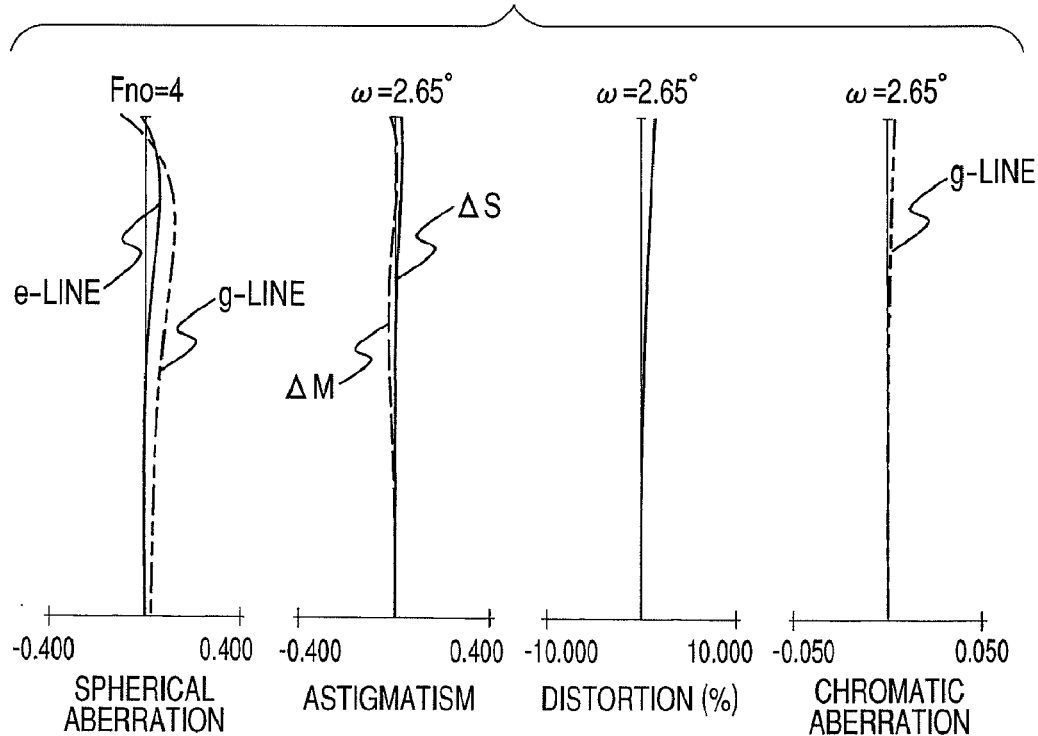

FIGS. 16A, 16B and 16C are longitudinal aberration charts at the wide angle end (f=8.5 mm), at a middle zoom position (f=31.81 mm), and at a telephoto end (f=119 mm) for an infinite object according to Embodiment 3 of the present invention.

Figure 17:
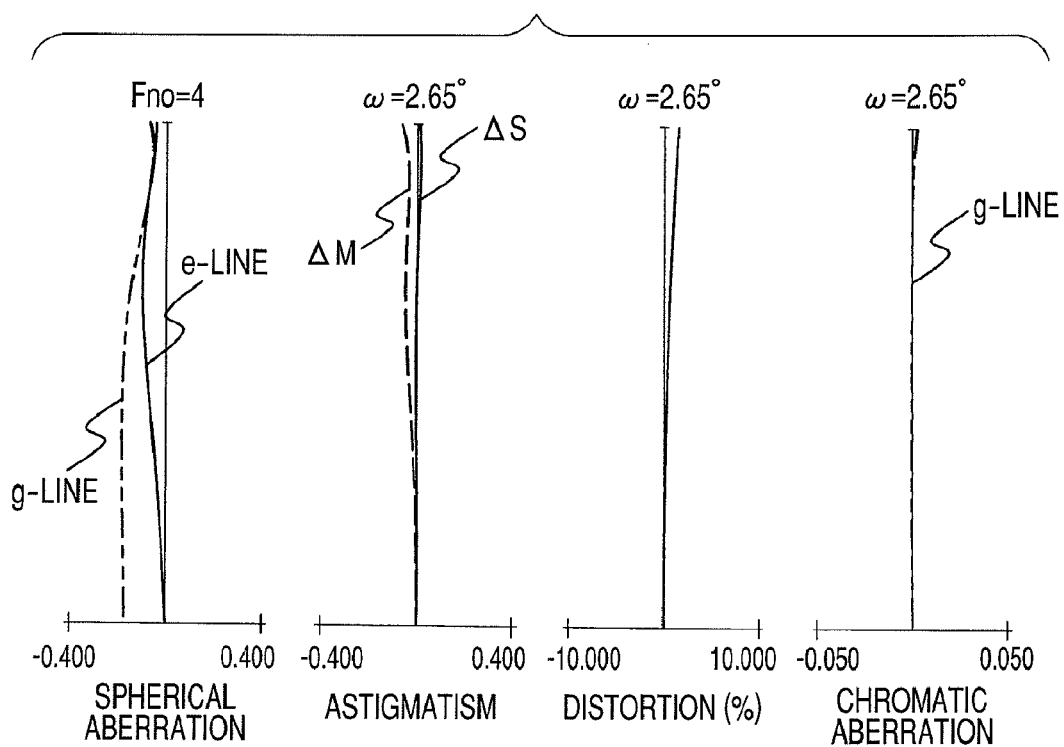
FIG. 17 is a longitudinal aberration chart at the telephoto end for an object in close proximity according to Embodiment 3 of the present invention.

FIG. 17 is a longitudinal aberration chart at the telephoto end (f=119 mm) for an object in close proximity (0.8 m) according to Embodiment 3 of the present invention.

Figure 18A:
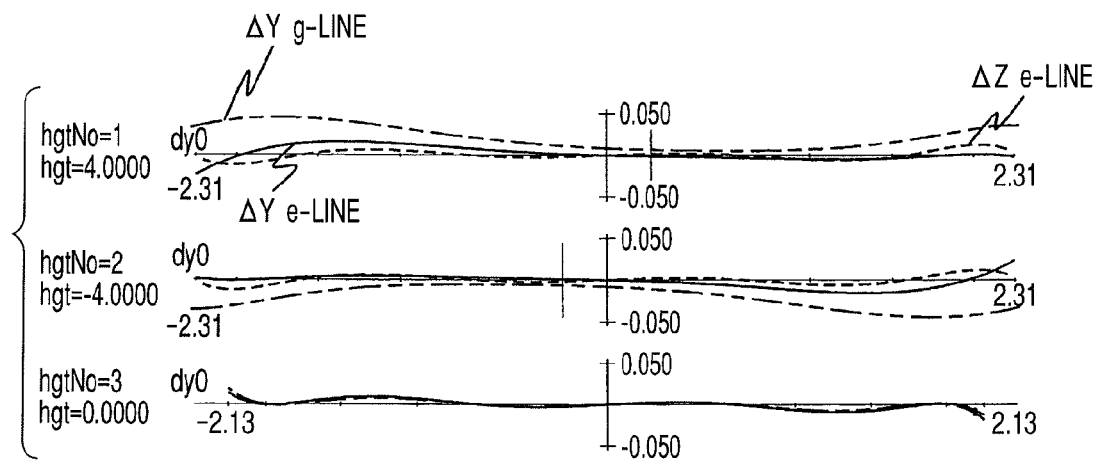
FIGS. 18A, 18B and 18C are lateral aberration charts at the wide angle end, at the middle zoom position, and at the telephoto end for the infinite object according to Embodiment 3 of the present invention.
Figure 18B:
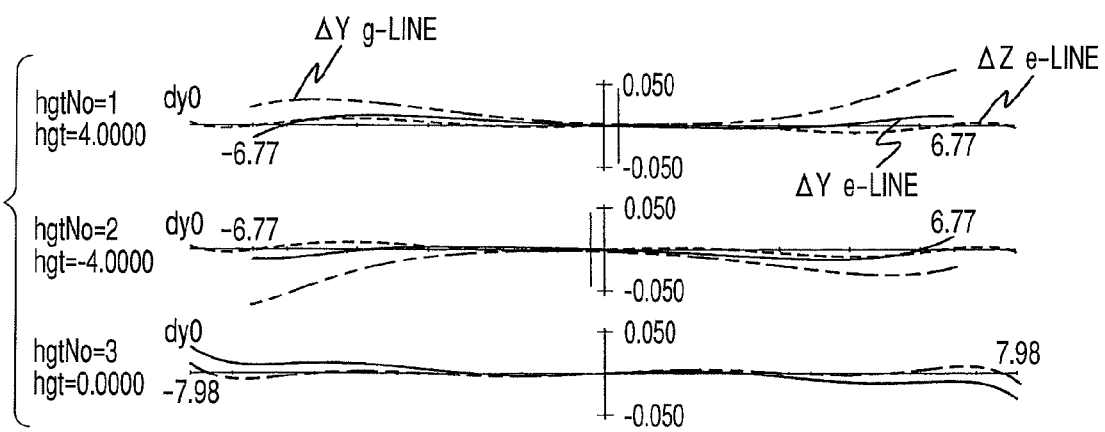
Figure 18C:
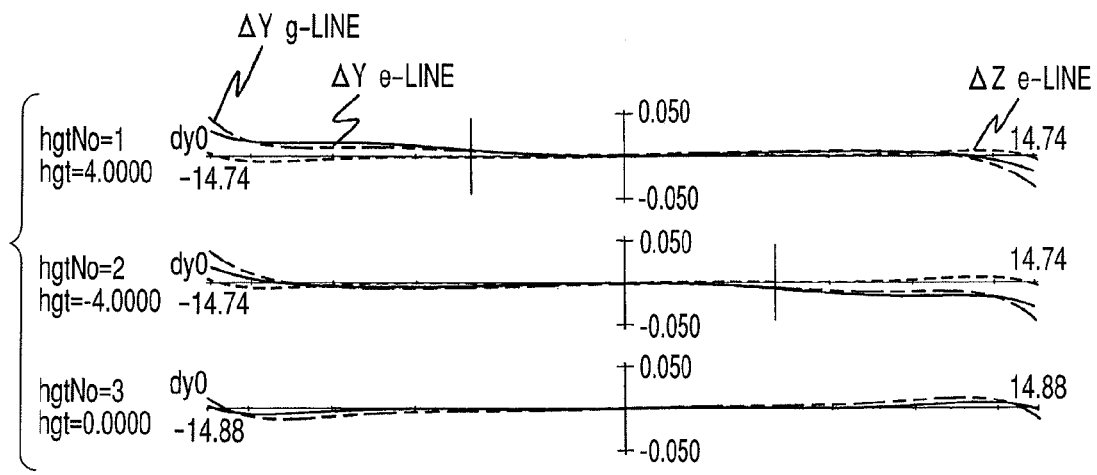

FIGS. 18A, 18B and 18C are lateral aberration charts at the wide angle end (f=8.5 mm), at the middle zoom position (f=31.81 mm), and at the telephoto end (f=119 mm) for the infinite object according to Embodiment 3 of the present invention.

Figure 19:
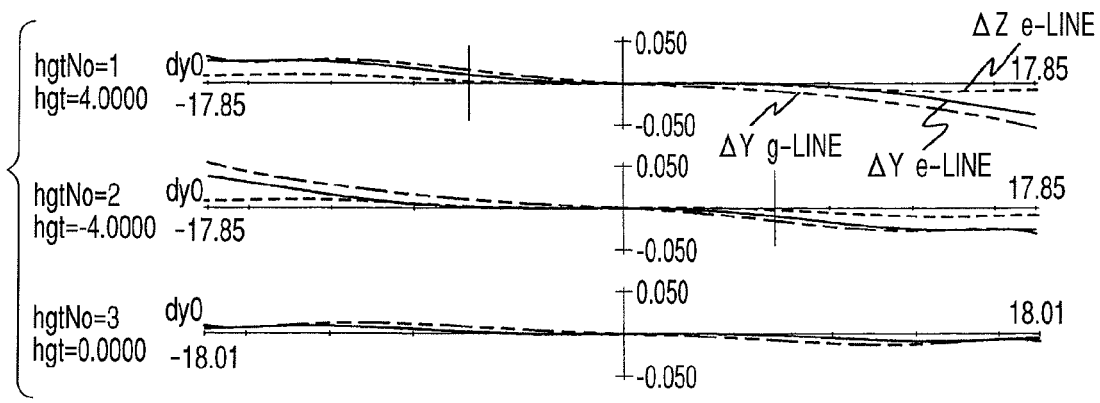
FIG. 19 is a lateral aberration chart at the telephoto end for the object in close proximity according to Embodiment 3 of the present invention.

FIG. 19 is a lateral aberration chart at the telephoto end (f=119 mm) for the object in close proximity (0.8 m) according to Embodiment 3 of the present invention.

Figure 20A:
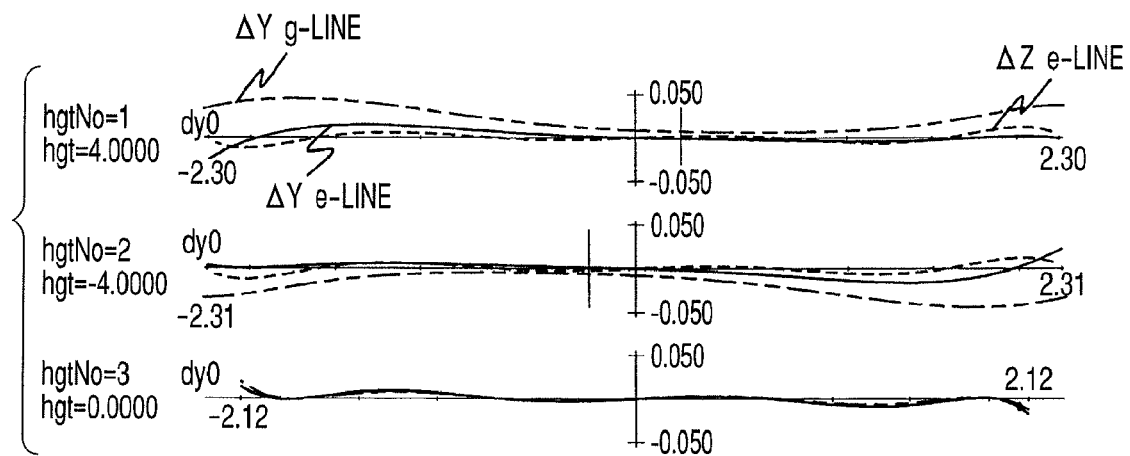
FIGS. 20A, 20B and 20C are lateral aberration charts at the wide angle end, at the middle zoom position, and at the telephoto end for the infinite object when a prism apex angle of a variable apex angle prism is 0.33 degrees according to Embodiment 3 of the present invention.
Figure 20B:
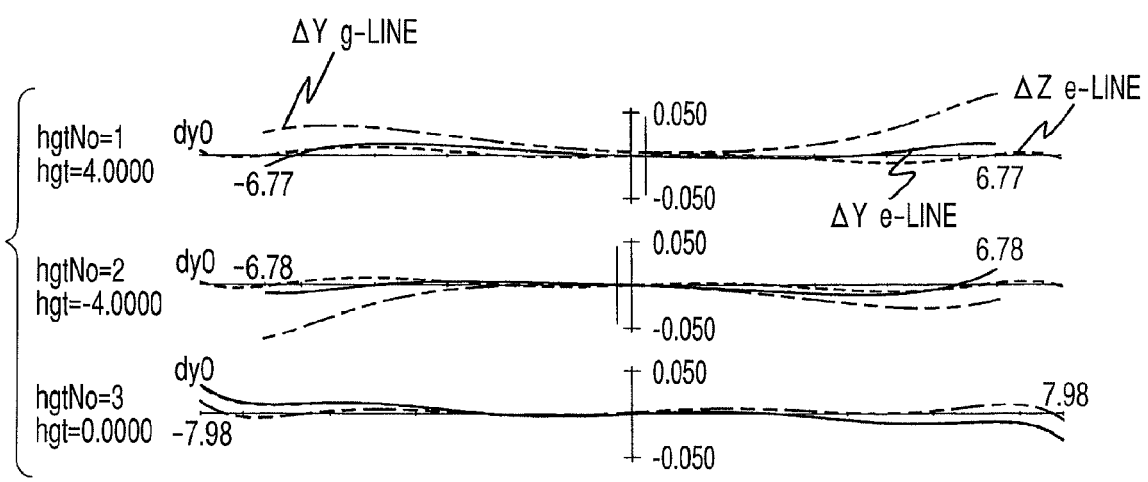
Figure 20C:
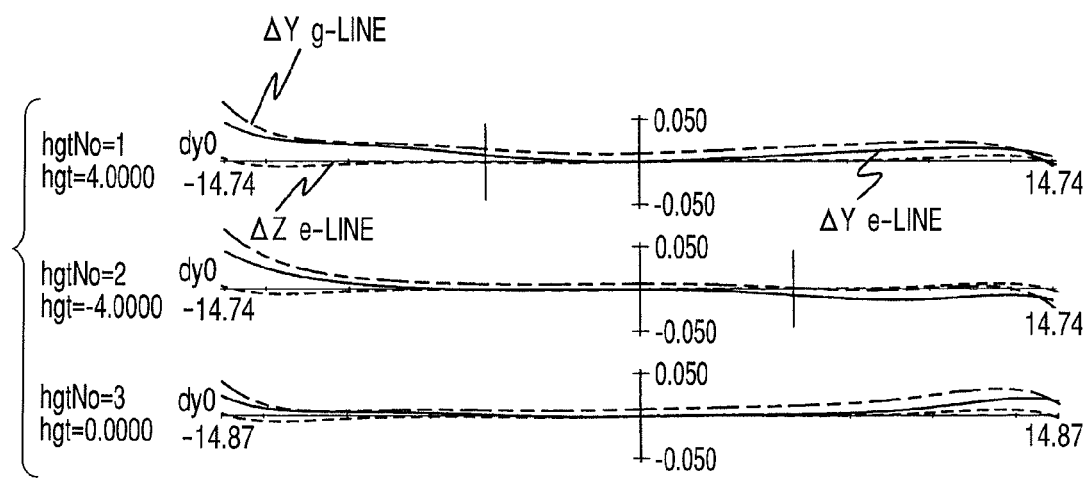

FIGS. 20A, 20B and 20C are lateral aberration charts at the wide angle end (f=8.5 mm), at the middle zoom position (f=31.81 mm), and at the telephoto end (f=119 mm) when the prism apex angle of the variable apex angle prism is 0.33 degrees according to Embodiment 3 of the present invention.

Figure 21:
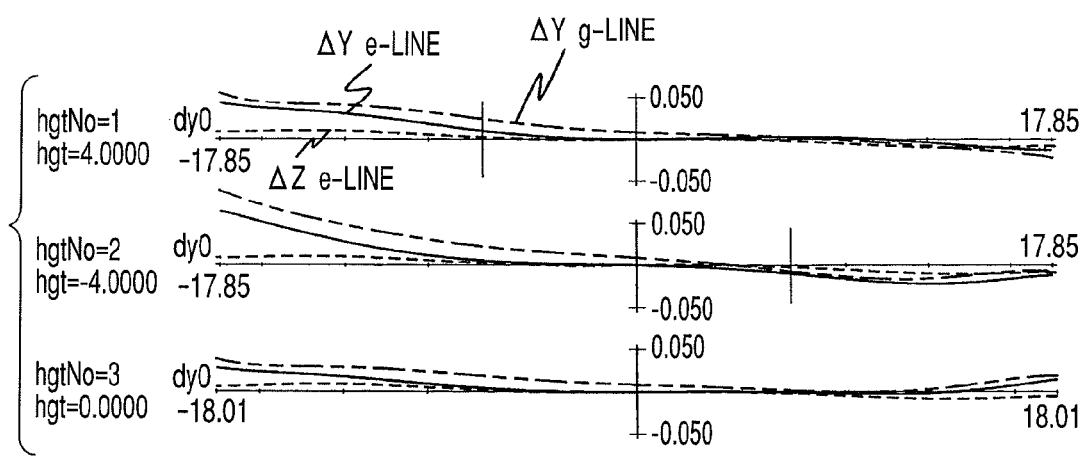
FIG. 21 is a lateral aberration chart at the telephoto end for the object in close proximity when the prism apex angle of the variable apex angle prism is 0.33 degrees according to Embodiment 3 of the present invention.

FIG. 21 is a lateral aberration chart at the telephoto end (f=119 mm) for the object in close proximity (0.8 m) when the prism apex angle of the variable apex angle prism is 0.33 degrees according to Embodiment 3 of the present invention.

Figure 22:
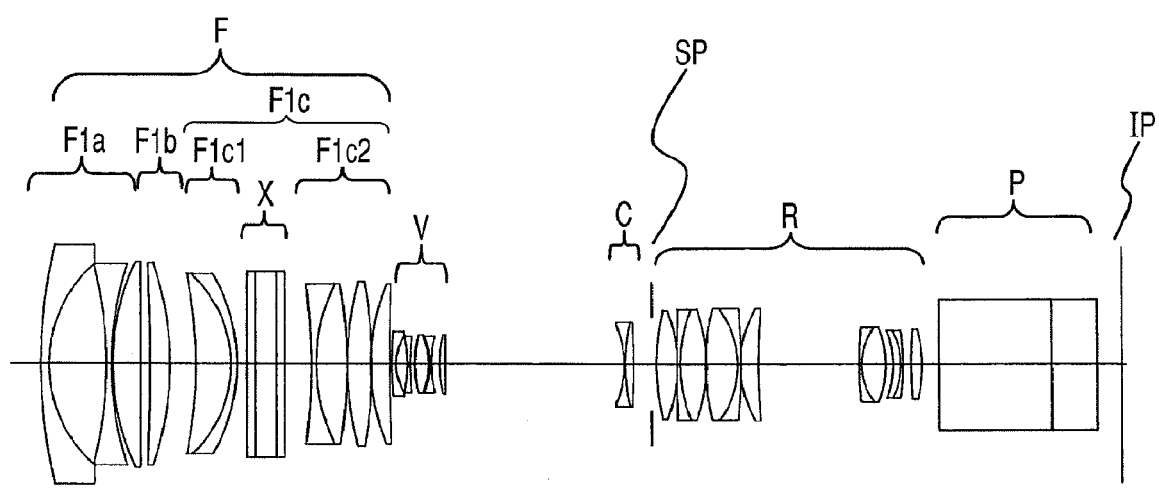
FIG. 22 is a lens cross section at a wide angle end according to Embodiment 4 of the present invention.

FIG. 22 is a lens cross section at a wide angle end according to Embodiment 4 of the present invention.

Figure 23A:
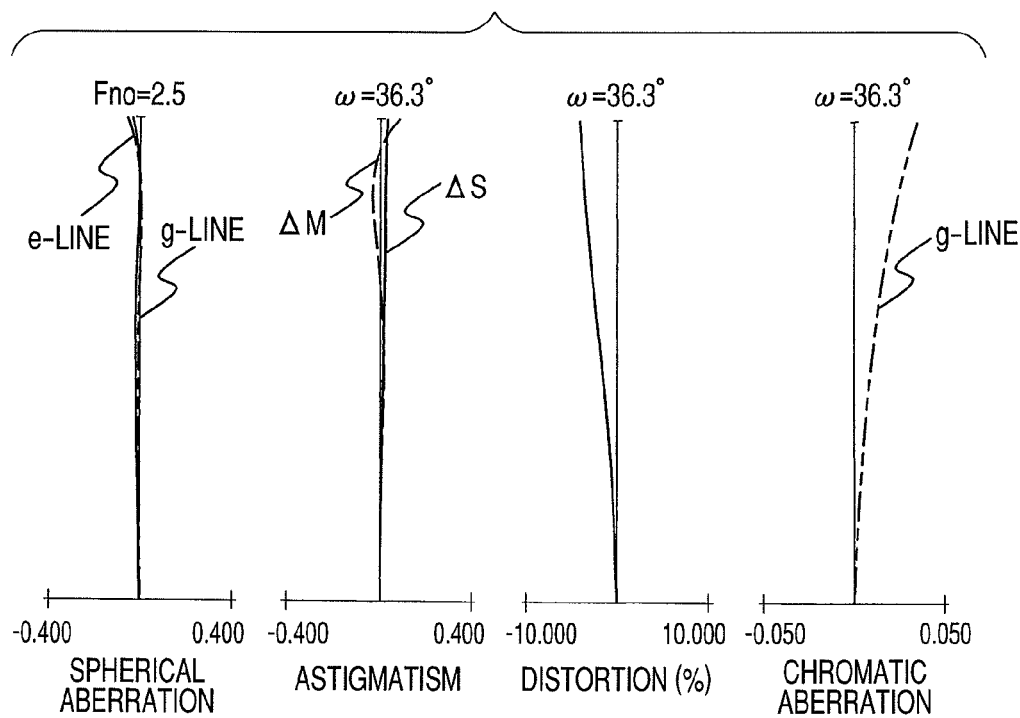
FIGS. 23A, 23B and 23C are longitudinal aberration charts at the wide angle end, at a middle zoom position, and at a telephoto end for an infinite object according to Embodiment 4 of the present invention.
Figure 23B:
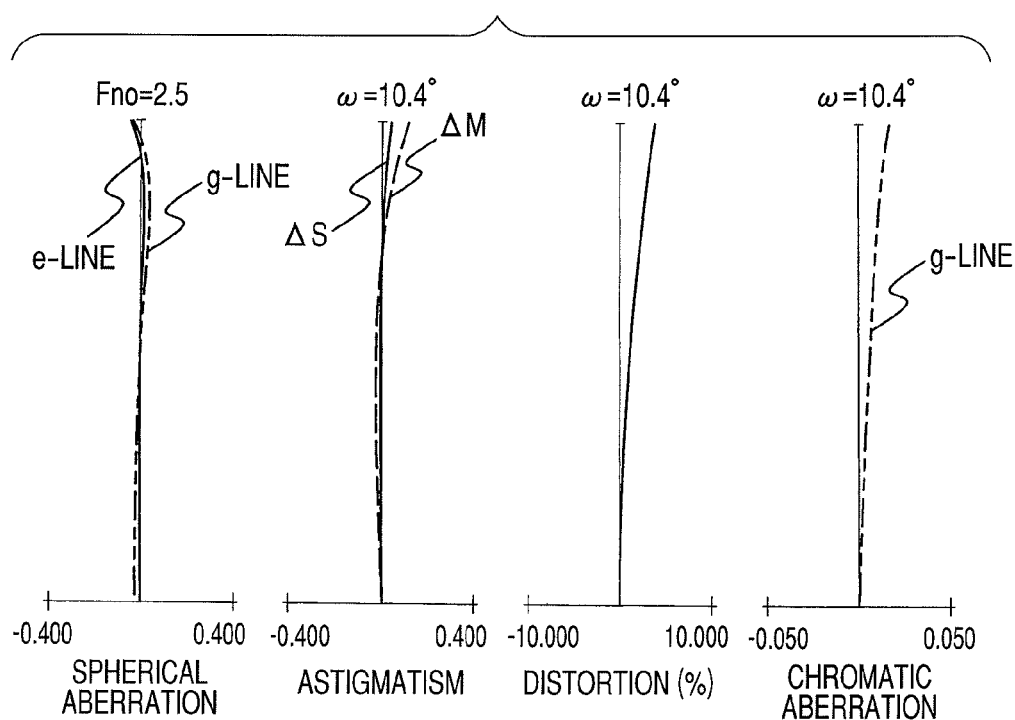
Figure 23C:
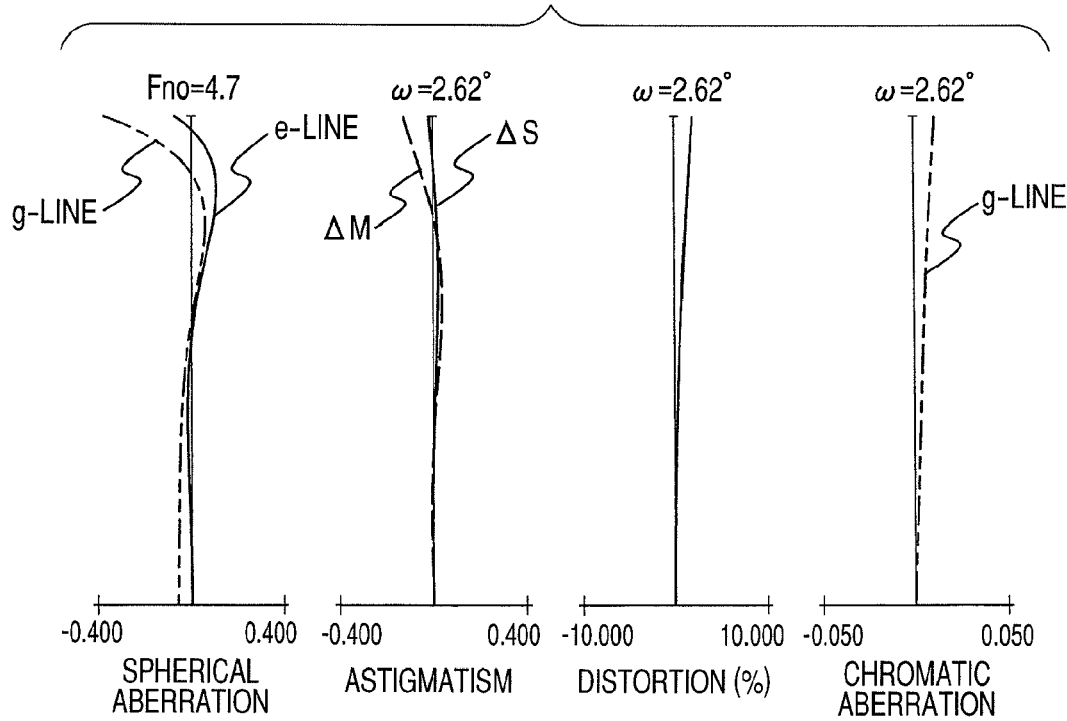

FIGS. 23A, 23B and 23C are longitudinal aberration charts at the wide angle end (f=7.5 mm), at a middle zoom position (f=30 mm), and at a telephoto end (f=120 mm) for an infinite object according to Embodiment 4 of the present invention.

Figure 24:
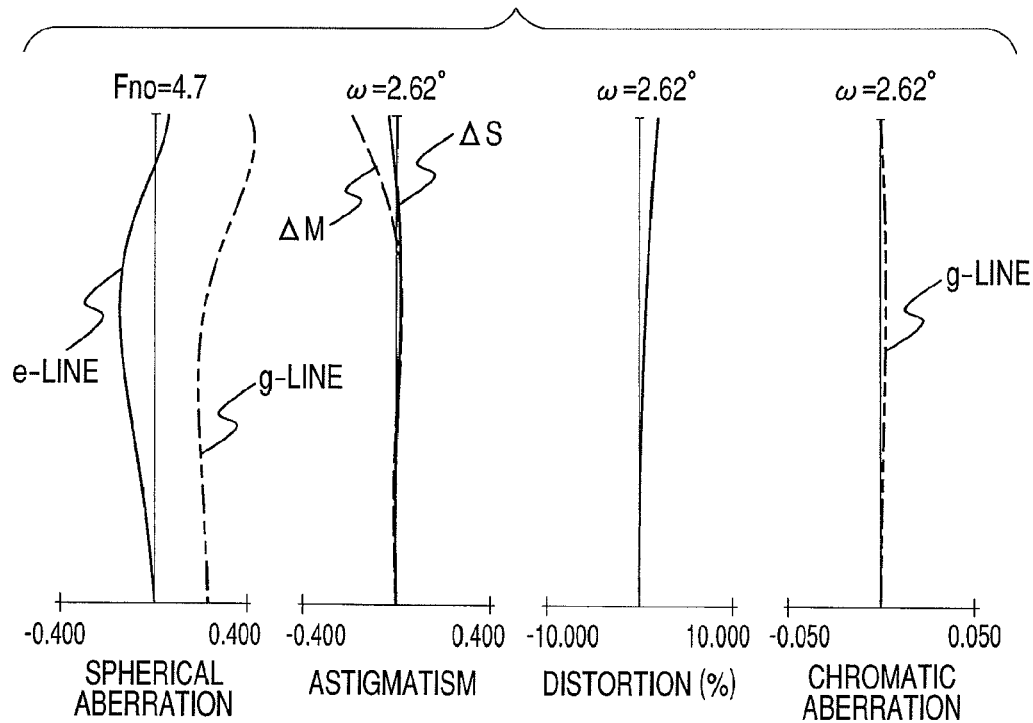
FIG. 24 is a longitudinal aberration chart at the telephoto end for an object in close proximity according to Embodiment 4 of the present invention.

FIG. 24 is a longitudinal aberration chart at the telephoto end (f=120 mm) for an object in close proximity (0.8 m) according to Embodiment 4 of the present invention.

Figure 25A:
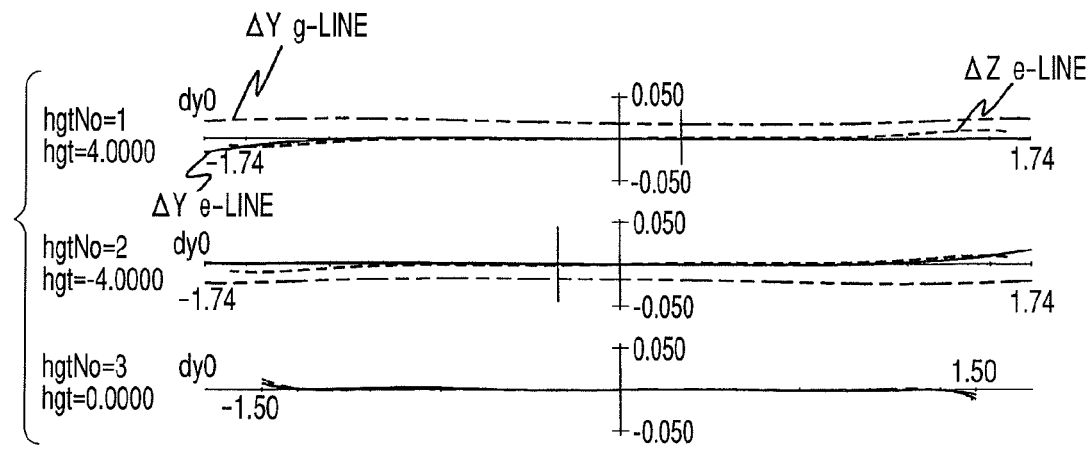
FIGS. 25A, 25B and 25C are lateral aberration charts at the wide angle end, at the middle zoom position, and at the telephoto end for the infinite object according to Embodiment 4 of the present invention.
Figure 25B:
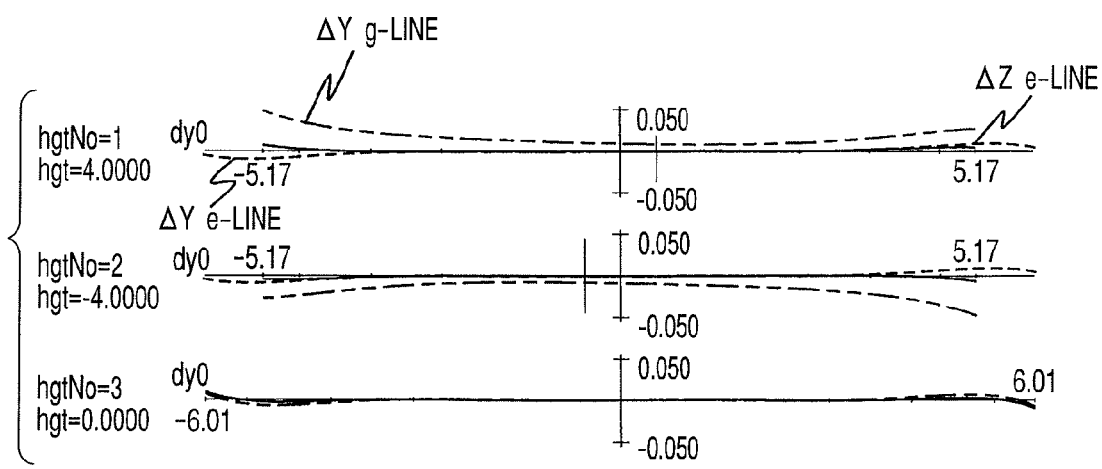
Figure 25C:
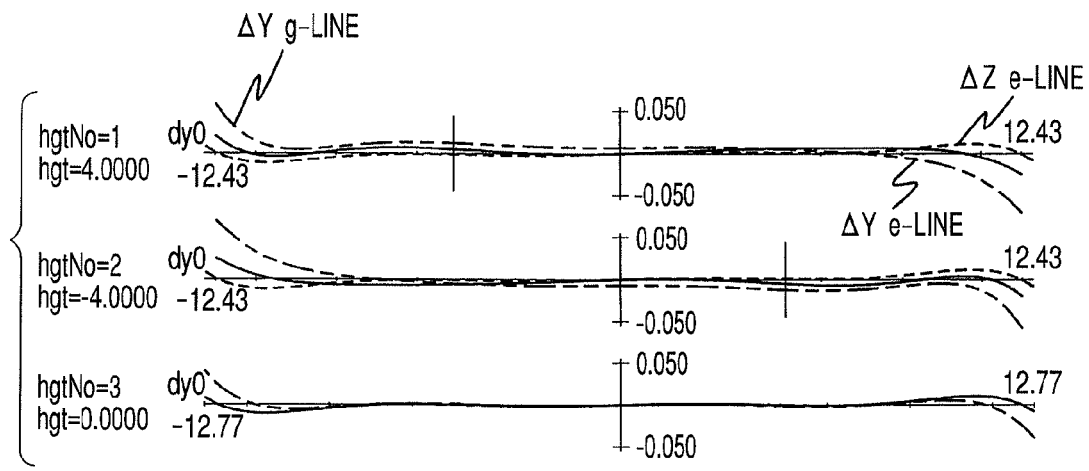

FIGS. 25A, 25B and 25C are lateral aberration charts at the wide angle end (f=7.5 mm), at the middle zoom position (f=30 mm), and at the telephoto end (f=120 mm) for the infinite object according to Embodiment 4 of the present invention.

Figure 26:
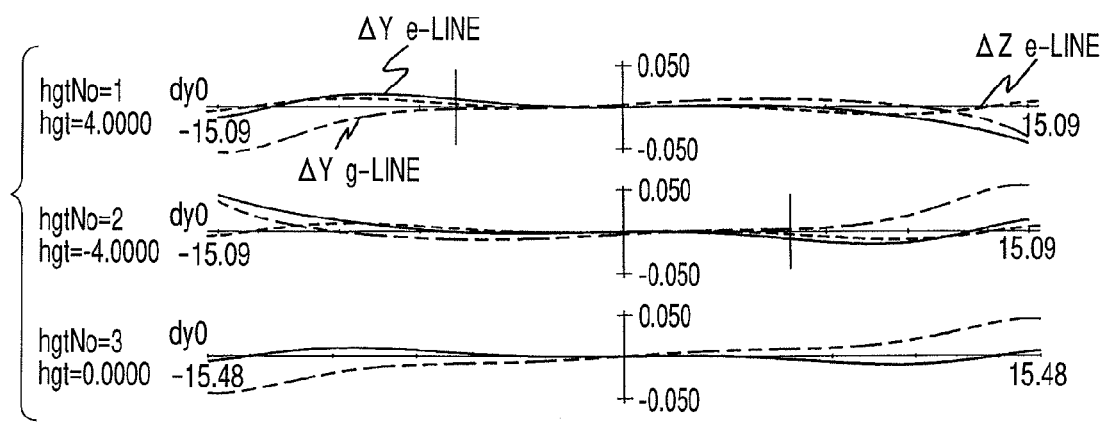
FIG. 26 is a lateral aberration chart at the telephoto end for the object in close proximity according to Embodiment 4 of the present invention.

FIG. 26 is a lateral aberration chart at the telephoto end (f=120 mm) for the object in close proximity (0.8 m) according to Embodiment 4 of the present invention.

Figure 27A:
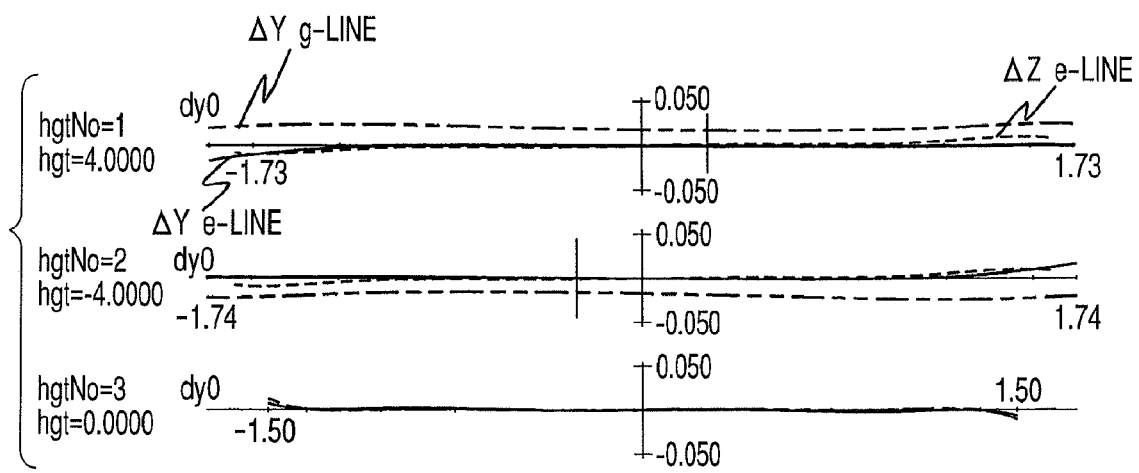
FIGS. 27A, 27B and 27C are lateral aberration charts at the wide angle end, at the middle zoom position, and at the telephoto end for the infinite object when a prism apex angle of a variable apex angle prism is 0.3 degrees according to Embodiment 4 of the present invention.
Figure 27B:
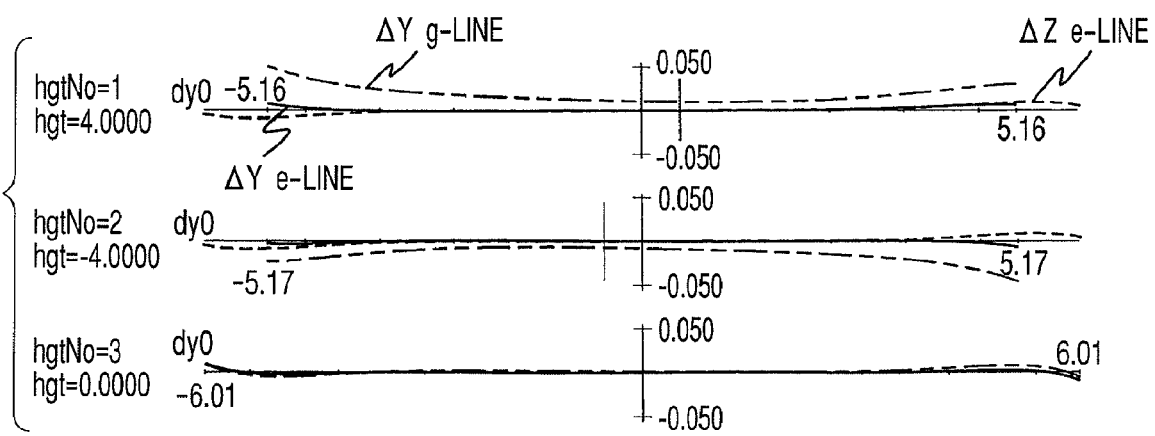
Figure 27C:
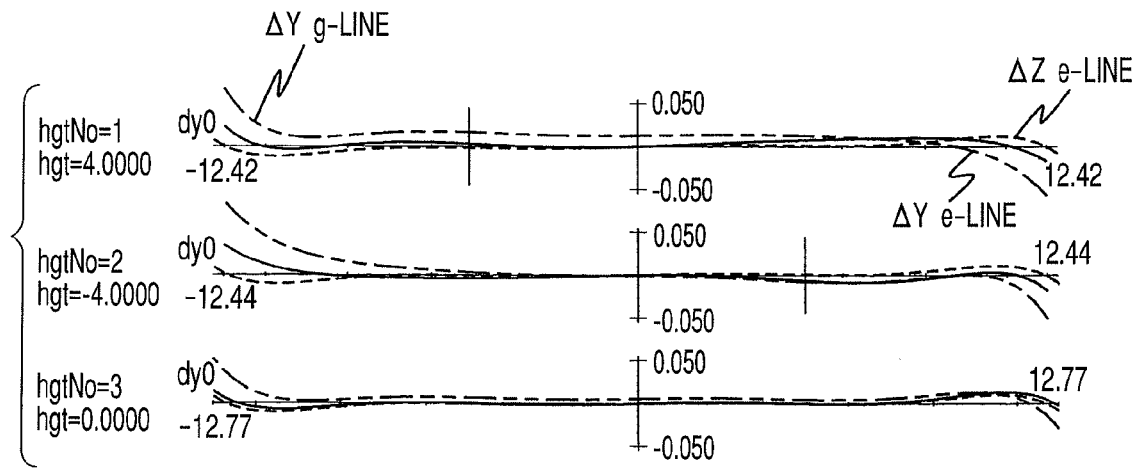

FIGS. 27A, 27B and 27C are lateral aberration charts at the wide angle end (f=7.5 mm), at the middle zoom position (f=30 mm), and at the telephoto end (f=120 mm) when the prism apex angle of the variable apex angle prism is 0.3 degrees according to Embodiment 4 of the present invention.

Figure 28:
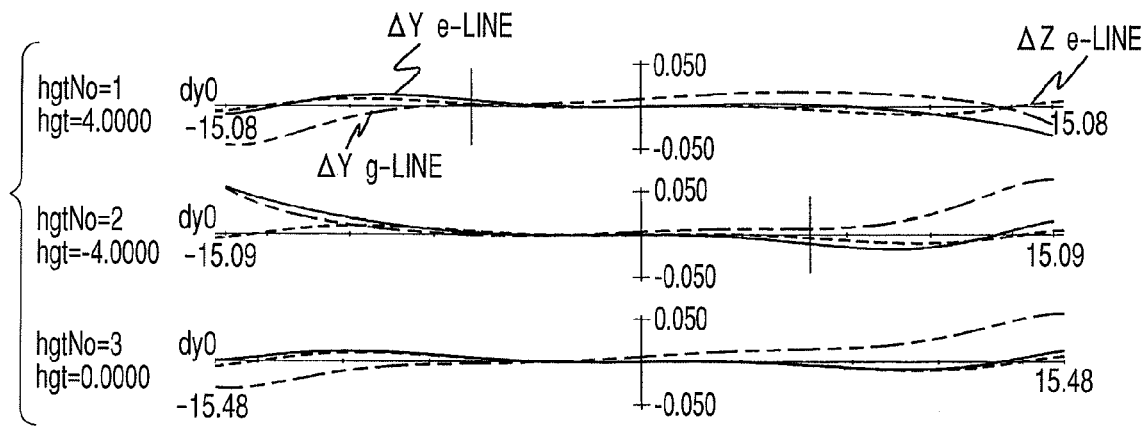
FIG. 28 is a lateral aberration chart at the telephoto end for the object in close proximity when the prism apex angle of the variable apex angle prism is 0.3 degrees according to Embodiment 4 of the present invention.

FIG. 28 is a lateral aberration chart at the telephoto end (f=120 mm) for the object in close proximity (0.8 m) when the prism apex angle of the variable apex angle prism is 0.3 degrees according to Embodiment 4 of the present invention.

Figure 29:
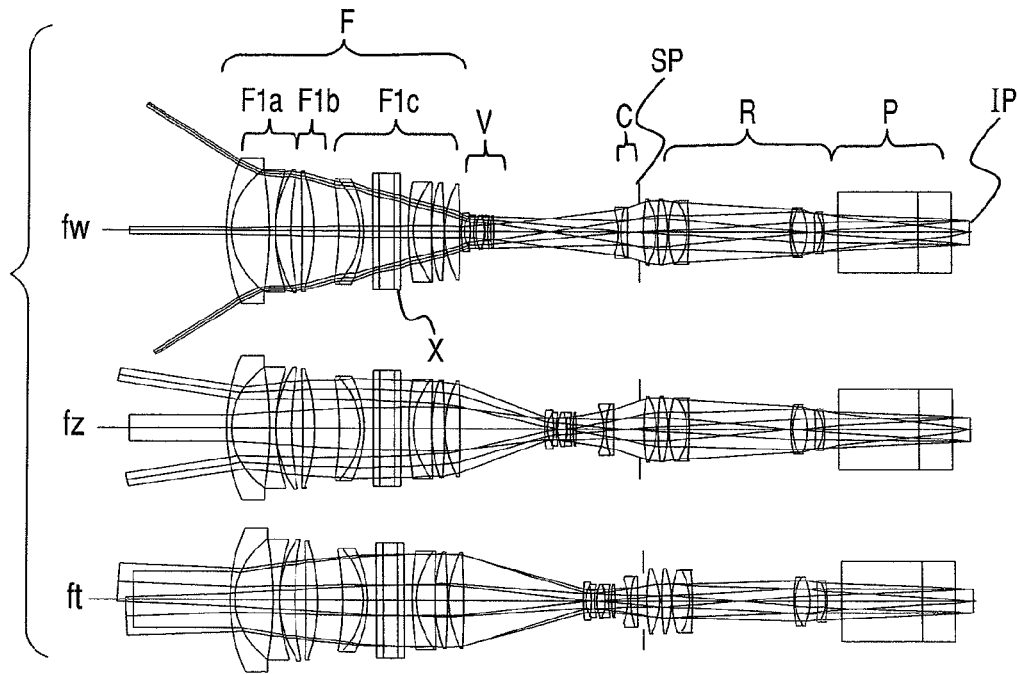
FIG. 29 is an optical path diagram at the wide angle end, at the middle zoom position, and at the telephoto end for the infinite object of FIG. 1.

FIG. 29 is an optical path diagram at the wide angle end (fw), at the middle zoom position (fz), and at the telephoto end (ft) for the infinite object of FIG. 1.

Figure 30:
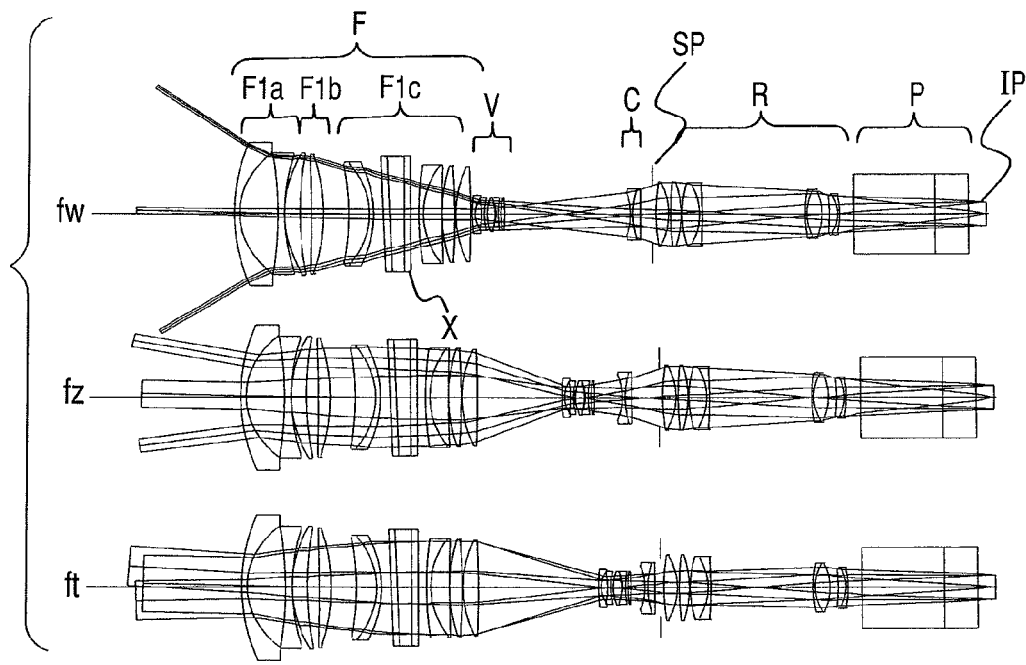
FIG. 30 is an optical path diagram when the prism apex angle of the variable apex angle prism is varied at the wide angle end, at the middle zoom position, and at the telephoto end for the infinite object of FIG. 1.

FIG. 30 is an optical path diagram when the prism apex angle of the variable apex angle prism is varied at the wide angle end (fw), at the middle zoom position (fz), and at the telephoto end (ft) for the infinite object of FIG. 1.

Figure 31:
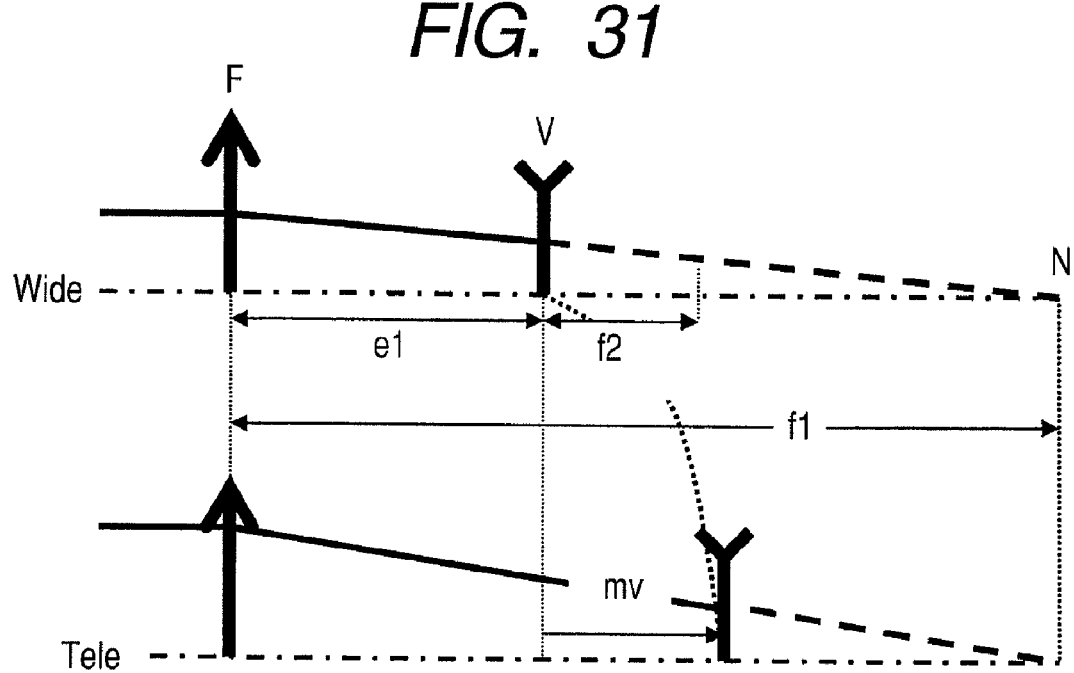
FIG. 31 is a conceptual diagram of optical locations of a first lens unit and a second lens unit at the wide angle end and at the telephoto end in the zoom lens system according to the present invention.

FIG. 31 is a conceptual diagram of optical locations of the first lens unit and the second lens unit at the wide angle end and at the telephoto end in the zoom lens system according to the present invention.

Figure 32:
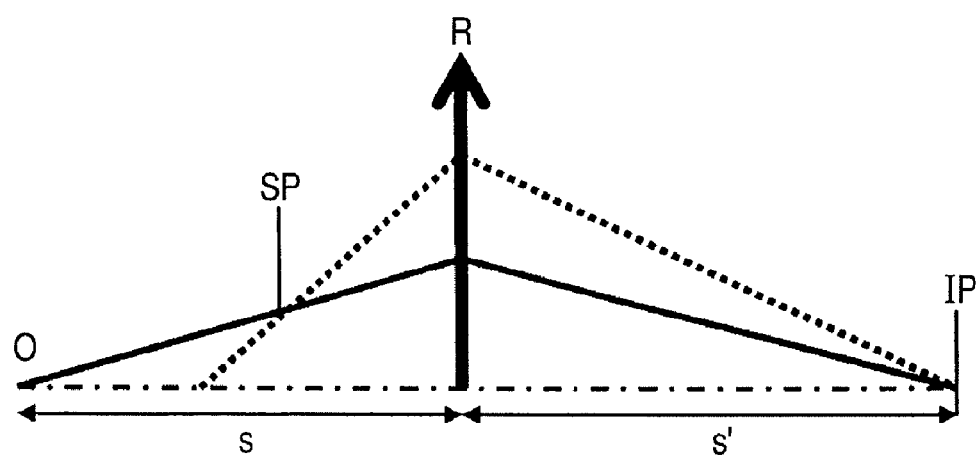
FIG. 32 is a conceptual diagram of an optical location of a fourth lens unit of the zoom lens system according to the present invention.

FIG. 32 is a conceptual diagram of an optical location of the fourth lens unit of the zoom lens system according to the present invention.

Figure 33:
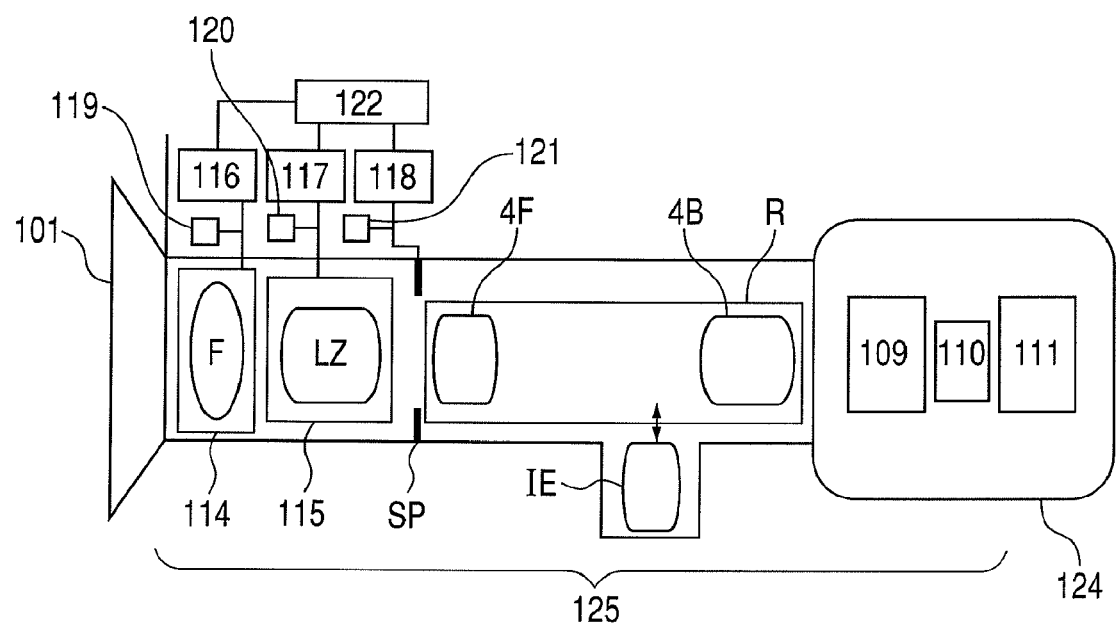
FIG. 33 is a schematic diagram of a main part of a camera according to the present invention.

FIG. 33 is a schematic diagram of a main part of a camera including the zoom lens system according to the present invention.

Next, features of the zoom lens system according to the present invention are described.

In the lens cross section, the zoom lens system includes a first lens unit F that has a positive refractive power and does not move for zooming (magnification), and a second lens unit (variator) V that has a negative refractive power and moves during magnification.

Further, the zoom lens system includes a third lens unit (compensator) C having a negative refractive power for compensating for the variation of the position of an image plane accompanying the magnification, an aperture stop SP, a fourth lens unit R for imaging that has a positive refractive power and does not move for magnification, a color separation prism (or an optical filter) P, which is illustrated as a glass block, and an image plane IP, which corresponds to an imaging plane of a solid-state image pickup element (photoelectric transducer) or the like.

As described above, the zoom lens system of each embodiment is a four-group zoom lens system constituted by four lens units. The first lens unit F includes a front subunit F1a that has a negative refractive power and does not move for focusing, a middle subunit F1b that has a positive refractive power and moves in the optical axis direction for focusing, and a rear subunit F1c that has a positive refractive power and does not move for focusing.

Further, the first lens unit F includes a variable apex angle prism X that has a variable prism apex angle and is disposed on the image side of at least one lens element in the first lens unit F.

Specifically, the variable apex angle prism is disposed between a rear subunit front part F1c1 and a rear subunit rear part F1c2 which constitute the rear subunit F1c or between the middle subunit F1b and the rear subunit F1c.

The second lens unit V moves on the optical axis toward the image plane monotonously for magnification from the wide angle end to the telephoto end. The third lens unit C moves in a nonlinear manner along a locus convex to the object side for the magnification from the wide angle end to the telephoto end, and hence the variation of the position of the image plane accompanying the magnification is compensated. The second lens unit V and the third lens unit C constitute the variable magnification lens group.

Note that it is possible to dispose in the fourth lens unit R of each embodiment a focal length conversion optical system for changing a focal length range of the entire system, which is detachable from the optical path.

In the aberration chart, the spherical aberration is illustrated by a g-line and an e-line. ΔM and ΔS denote a meridional image plane and a sagittal image plane. Lateral chromatic aberration is illustrated by the g-line. Fno denotes an f-number, and ω denotes a half field angle.

In the lateral aberration chart, cases of image height of 4 mm, −4 mm and 0 mm are illustrated in the diagram from the top.

Further, in the following embodiments, the wide angle end and the telephoto end mean zoom positions when the second lens unit V for the magnification is located at both ends in the movable range after moving mechanically on the optical axis.

First, decentering aberration with respect to the image plane that occurs when a predetermined surface (optical surface such as a lens surface or a flat surface) in the optical system is inclined with respect to the optical axis so that decentering occurs (hereinafter, referred to as image stabilization aberration) is described from a standpoint of the aberration theory based on the method described by the author, Mr. Kimura in the "Optical Society of Japan, Nineteenth Optical Symposium Preprint, Lecture No. 17".

When the ν-th surface in the optical system is inclined and decentered by an angle ε, an aberration amount ΔY (or ΔZ) of the entire system becomes a sum of an aberration amount ΔY0 (or ΔZ0) before the decentering and an image stabilization aberration amount ΔY(ε) (or ΔZ(ε)) generated by the decentering as shown in the equation (a).

Here, the image stabilization aberration amounts ΔY(ε) and ΔZ(ε) are as shown in the equation (b). The equation (b) includes a primary origin movement Δε, a primary decentering coma coefficient IIε, a primary decentering astigmatism coefficient IIIε, a primary decentering field curvature coefficient Pε, and primary decentering distortion coefficients $V\varepsilon_1$ and $V\varepsilon_2$. In addition, the equation (b) is expressed with secondary decentering distortion coefficients $V\varepsilon^2_1$ and $V\varepsilon^2_2$, a secondary decentering astigmatism coefficient $III\varepsilon^2$, and a secondary decentering field curvature coefficient $P\varepsilon^2$. Further, when the ν-th surface is inclined and decentered by an angle ε for the image stabilization, generated decentering chromatic aberration ΔYc(ε) is expressed with a decentering chromatic aberration coefficient Δcε as shown in the equation (c).

$$\Delta Y = \Delta Y0 + \Delta Y(\varepsilon) \qquad (a)$$
$$\Delta Z = \Delta Z0 + \Delta Z(\varepsilon)$$

$$\Delta Y(\varepsilon) = -\frac{\varepsilon}{2}(\Delta \varepsilon) - \frac{\varepsilon}{2}[Y'^2\{(2+\cos 2\phi_w)V\varepsilon_1 V\varepsilon_2\}] + \qquad (b)$$
$$2(NA)Y'[\{(2\cos(\phi_R - \phi_w) + \cos(\phi_R + \phi_w))III\varepsilon - \cos\phi_R\cos\phi_w P\varepsilon\} + $$
$$(NA)^2(2 + \cos 2\phi_R)II\varepsilon] - $$
$$\frac{\varepsilon^2}{2}[Y'\cos\phi_w(3V\varepsilon_1^2 - 2V\varepsilon_2^2) + (NA)\cos\phi_R(3III\varepsilon^2 + P\varepsilon^2)]$$

$$\Delta Z(\varepsilon) = -\frac{\varepsilon}{2}\Big[Y'^2\sin 2\phi_w V\varepsilon_1 + 2(NA)Y'$$
$$\{(\sin(\phi_R + \phi_w)III\varepsilon + \sin\phi_R\sin\phi_w P\varepsilon\} + (NA)^2\sin 2\phi_R II\varepsilon] - $$
$$\frac{\varepsilon^2}{2}[Y'\sin\phi_w V\varepsilon_1^2 + (NA)\sin\phi_R(III\varepsilon^2 + P\varepsilon^2)]$$

$$\Delta Yc(\varepsilon) = -\varepsilon(\Delta c\varepsilon) \qquad (c)$$

Here, NA denotes a numerical aperture of the optical system, φR denotes an azimuth angle of a ray on a principal plane on the object side, φω denotes an azimuth angle between the decentering direction and the Y axis, and Y' denotes an ideal image height. In addition, the individual image stabilization aberration coefficients are expressed by the equations below.

$$(\Delta\varepsilon)_v = -2(\alpha_v q_v - \alpha'_v q'_v) \qquad (d)$$

$$(II\varepsilon)_v = \left(\alpha_v q_v \sum_{u=1}^{v-1} II_u - \alpha'_v q'_v \sum_{u=1}^{v} II_u\right) - \left(\overline{\alpha_v}p_v \sum_{u=1}^{v-1} I_u - \overline{\alpha'_v}p'_v \sum_{u=1}^{v} I_u\right) \qquad (e)$$

$$(III\varepsilon)_v = \left(\alpha_v q_v \sum_{u=1}^{v-1} III_u - \alpha'_v q'_v \sum_{u=1}^{v} III_u\right) - \left(\overline{\alpha_v}p_v \sum_{u=1}^{v-1} II_u - \overline{\alpha'_v}p'_v \sum_{u=1}^{v} II_u\right) \qquad (f)$$

$$(V\varepsilon_1)_v = \left(\alpha_v q_v \sum_{u=1}^{v-1} V_u - \alpha'_v q'_v \sum_{u=1}^{v} V_u\right) - \qquad (g)$$
$$\left(\overline{\alpha_v}p_v \sum_{u=1}^{v-1} III_u - \overline{\alpha'_v}p'_v \sum_{u=1}^{v} III_u\right) + \left(\frac{\alpha'_v}{N'_v} - \frac{\alpha_v}{N_v}\right)$$

$$(V\varepsilon_2)_v = \left(\overline{\alpha_v}p_v \sum_{u=1}^{v-1} P_u - \overline{\alpha'_v}p'_v \sum_{u=1}^{v} P_u\right) + \left(\frac{\alpha'_v}{N'_v} - \frac{\alpha_v}{N_v}\right) \qquad (h)$$

$$(P\varepsilon)_v \left(\alpha_v q_v \sum_{u=1}^{v-1} P_u - \alpha'_v q'_v \sum_{u=1}^{v} P_u\right) + \left(\frac{\alpha'_v}{N'_v} - \frac{\alpha_v}{N_v}\right) \qquad (i)$$

$$(III\varepsilon^2)_v = \alpha'^2_v q'^2_v III_v - 2\alpha_v q'_v \overline{\alpha_v} p'_v II_v + \overline{\alpha'_v}^2 p'^2_v I_v + \qquad (j)$$
$$(\alpha_v q_v - \alpha'_v q'_v)^2 \sum_{u=1}^{v-1} III_u - 2(\alpha_v q_v - \alpha'_v q'_v)(\overline{\alpha_v}p_v - \overline{\alpha'_v}p'_v) \sum_{u=1}^{v-1} II_u + $$
$$(\overline{\alpha_v}p_v - \overline{\alpha'_v}p'_v)^2 \sum_{u=1}^{v-1} I_u$$

$$(P\varepsilon^2)_v = \alpha'^2_v q'^2_v Pv + (\alpha_v q_v - \alpha'_v q'_v)^2 \sum_{u=1}^{v-1} P_u + 2\alpha'_v q'_v \left(\frac{\alpha_v}{N_v} - \frac{\alpha'_v}{N'_v}\right) \qquad (k)$$

$$(V\varepsilon_1^2)_v = \qquad (l)$$
$$\alpha'^2_v q'^2_v V_v - 2\alpha_v q'_v \overline{\alpha_v}p'_v III_v + \overline{\alpha'_v}^2 p'^2_v II_v + (\alpha_v q_v - \alpha'_v q'_v)^2 \sum_{u=1}^{v-1} V_u - $$
$$2(\alpha_v q_v - \alpha'_v q'_v)(\overline{\alpha_v}p_v - \overline{\alpha'_v}p'_v) \sum_{u=1}^{v-1} III_u + (\overline{\alpha_v}p_v - \overline{\alpha'_v}p'_v)^2 \sum_{u=1}^{v-1} II_u$$

-continued $$(V\varepsilon_2^2)_v = \alpha'_v q'_v \overline{\alpha'_v} p'_v P_v - (\alpha_v q_v - \alpha'_v q'_v)(\overline{\alpha'_v} p'_v - \overline{\alpha_v} p_v) \sum_{u=1}^{v-1} P_u - \overline{\alpha'_v} p'_v \left( \frac{\alpha_v}{N_v} - \frac{\alpha'_v}{N'_v} \right) + 2\alpha'_v q'_v \left( \frac{\overline{\alpha_v}}{N_v} - \frac{\overline{\alpha'_v}}{N'_v} \right) \quad (m)$$

$$(\Delta c\varepsilon)_v = \left( \alpha_v q_v \sum_{u=1}^{v-1} T_u - \alpha'_v q'_v \sum_{u=1}^{v} T_u \right) - \left( \overline{\alpha_v} p_v \sum_{u=1}^{v-1} L_u - \overline{\alpha'_v} p'_v \sum_{u=1}^{v} L_u \right) \quad (n)$$

Here, $\alpha_v$ denotes an axial ray incident conversion inclination angle on the v-th surface, $\alpha_v'$ denotes an axial ray exit conversion inclination angle on the v-th surface, $\overline{a_v}$ denotes an off-axis ray incident conversion inclination angle on the v-th surface, $\overline{a_v}'$ denotes an off-axial ray exit conversion inclination angle on the v-th surface, $I_v$, $II_v$, $III_v$, $P_v$, $V_v$, $L_v$, $T_v$ . . . denote aberration coefficient share values on the v-th surface, N denotes a refractive index of a medium of the v-th surface on the object side, N' denotes a refractive index of a medium of the v-th surface, p (or p') denotes a distance between an inclination center of the v-th surface and a position of the entrance pupil (or the exit pupil), and q (or q') denotes a distance between an inclination center of the v-th surface and an object plane (or the image plane). Among these variables, the primary origin movement ($\Delta\varepsilon$) indicates an image movement caused by the inclination and decentering, and an imaging performance is affected by the various aberration coefficients (II$\varepsilon$), (III$\varepsilon$), (P$\varepsilon$), (V$\varepsilon$) and ($\Delta c\varepsilon$).

In order to reduce occurrence of the image stabilization aberration, it is necessary first to decrease the inclination and decentering amount $\varepsilon$ of the variable apex angle prism as shown in the equations (b) and (c).

In addition, each of the image stabilization aberration coefficients shown in the equations (d) to (n) is expressed as a linear combination between the aberration coefficient of the variable apex angle prism and the aberration coefficient of the lens unit on the object side of the variable apex angle prism. Therefore, in order to reduce occurrence of the image stabilization aberration, it is necessary to set the image stabilization aberration amount due to the aberration coefficient of the variable apex angle prism and the image stabilization aberration amount due to the aberration coefficient of the lens units on the object side of the variable apex angle prism with good balance so that they cancel each other. Specifically, it is necessary to set appropriately a location of the variable apex angle prism, the axial and the off-axial ray conversion inclination angles of incidence and exit with respect to the variable apex angle prism, the refractive index and dispersion of the variable apex angle prism, a structure and a power arrangement of the lens units disposed on the object side of the variable apex angle prism, and the like.

In particular, it is necessary to compensate appropriately for primary image stabilization coma shown mainly in the equation (e) in order to remove deterioration of a central image, which is caused by the inclination and decentering of the variable apex angle prism. In addition, it is necessary to compensate appropriately for the primary image stabilization field curvature shown mainly in the equations (f) and (i) in order to compensate appropriately for partial blurring generated simultaneously.

Further, in order to eliminate a color shift of a central image generated by inclination and decentering of the variable apex angle prism, it is necessary to compensate appropriately for image stabilization chromatic aberration shown in the equation (n) mainly.

Obviously, it is also necessary to compensate for other various aberration values appropriately as a matter of course.

The variable apex angle prism X of this embodiment is constituted by two transparent parallel flat plates and bellows disposed on the periphery thereof defining a space in which a medium that can be deformed, such as liquid having a refractive index higher than that of the parallel flat plates, transparent liquid such as silicone oil or a transparent elastic member (hereinafter, collectively referred to as a "deformable medium"), is filled and enclosed.

Further, at least one of the two parallel flat plates is inclined with respect to the optical axis so that the entire shape is turned from the parallel shape to a wedge-like shape (or a prism shape).

The relative inclination between the two parallel flat plates forms the prism apex angle of the variable apex angle prism. Note that the prism apex angle means an angle formed between the above-mentioned two parallel flat plates (or extended lines thereof).

In addition, a change of the prism apex angle of the variable apex angle prism X may be obtained by inclining the two parallel flat plates in the directions orthogonal to each other. In this case, the change of the prism apex angle can be represented by a combination of vectors of inclinations in the directions orthogonal to each other.

In this embodiment, the prism apex angle of the variable apex angle prism X is changed according to oscillation of the zoom lens system so that the passing ray is deflected by a predetermined quantity. Thus, the shot image is displaced in the direction perpendicular to the optical axis so as to compensate for the shot image blurring.

FIG. 29 is an optical path diagram of the zoom lens system according to Embodiment 1 of the present invention at the wide angle end fw, at the zoom position fz, and at the telephoto end ft in the case where the prism apex angle of the variable apex angle prism X is set to be 0 degrees (so as to be parallel flat plates) so that the image stabilization is not performed (hereinafter, referred to as a reference state).

Here, Z denotes a zoom ratio, and the focal lengths of the entire system at the wide angle end and at the telephoto end are denoted by fw and ft, respectively. In this case, the zoom position fz is the middle zoom position, and "fz=fw×$Z^{1/2}$" and "Z=ft/fw" hold.

FIG. 30 is an optical path diagram of the zoom lens system according to Embodiment 1 of the present invention at the wide angle end fw, at the zoom position fz, and at the telephoto end ft in the case where the parallel flat plates of the variable apex angle prism X are inclined with respect to the optical axis so that the prism apex angle is changed and decentered.

In each embodiment, a focal length of the entire system at the wide angle end is denoted by fw, a focal length of the first lens unit F is denoted by f1, an imaging magnification of the second lens unit V at the wide angle end is denoted by $\beta vw$, and an imaging magnification of the fourth lens unit R is denoted by $\beta r$.

In this case, the following expressions are satisfied.

$$4.3 < f1/fw < 10 \quad (1)$$

$$-0.8 < \beta vw < -0.2 \quad (2)$$

$$-1.9 < \beta r < -1.4 \quad (3)$$

The conditional expression (1) is related to a ratio of the focal length of the entire system to the focal length of the first lens unit F at the wide angle end. The conditional expression (2) is related to an imaging magnification of the second lens unit V at the wide angle end. The conditional expression (3) is related to a ratio of the imaging magnification of the fourth lens unit R. The conditional expressions (1) to (3) are defined so as to achieve a wide field angle, a small size and weight, and high performance.

Next, characteristics of a lens structure of a four-unit zoom lens system constituted by the four lens units according to the present invention are described.

Here, the focal lengths of the four-unit zoom lens system are expressed by the following equations.

$$fw = f1 \times \beta vw \times \beta cw \times \beta r \quad (\text{o-1})$$

$$ft = f1 \times \beta vt \times \beta ct \times \beta r \quad (\text{o-2})$$

$$Z = ft/fw = \beta vw/\beta vt \times \beta cw/\beta ct \quad (\text{o-3})$$

Here, fw denotes a focal length of the entire system at the wide angle end, ft denotes a focal length of the entire system at the telephoto end, f1 denotes a focal length of the first lens unit F, $\beta vw$ denotes an imaging magnification of the second lens unit V at the wide angle end, $\beta cw$ denotes an imaging magnification of the third lens unit C at the wide angle end, $\beta vt$ denotes an imaging magnification of the second lens unit V at the telephoto end, $\beta ct$ denotes an imaging magnification of the third lens unit C at the telephoto end, and $\beta r$ denotes an imaging magnification of the fourth lens unit R.

The imaging magnifications of the second lens unit V contributing to the magnification are expressed by the following equations.

$$\beta vw = f2/(f1 - e1 + f2) \quad (\text{p-1})$$

$$\beta vt = f2/(f1 - e1 - mv + f2) \quad (\text{p-2})$$

Here, f2 denotes a focal length of the second lens unit V, e1 denotes a principal point distance between the first lens unit F and the second lens unit V, and mv denotes a movement amount of the second lens unit V from the wide angle end to the telephoto end.

In addition, the imaging magnification of the fourth lens unit R is expressed by the following equation.

$$\beta r = S'/S \quad (\text{q})$$

Here, S denotes a distance from the object point of the fourth lens unit R to the front principal point position of the fourth lens unit R, and S' denotes a distance from the image point of the fourth lens unit R to the rear principal point position of the fourth lens unit R.

In order to achieve a wide field angle, a large aperture, a small size and weight, and high performance of the zoom lens system, it is necessary to set appropriately the parameters f1, $\beta vw$, $\beta cw$, and $\beta r$ in the equation (o-1).

The conditional expression (1) defines a ratio of a focal length f1 of the first lens unit F to a focal length fw of the entire system at the wide angle end, so as to specify a condition for achieving a wide field angle, a small size and weight, and high performance.

FIG. 31 illustrates a conceptual diagram of an optical location of the first lens unit F and the second lens unit V at the wide angle end (Wide) and at the telephoto end (Tele). Here, e1 denotes a principal point distance between the first lens unit F and the second lens unit V, N denotes an object point position of the second lens unit V (an image point position of the first lens unit F).

If f1/fw is greater than the upper limit of the conditional expression (1), the focal length f1 increases so that an effective diameter and a lens overall length of the first lens unit F are increased. In addition, it becomes difficult to achieve a wide field angle as shown in the equation (o-1). In addition, as illustrated in FIG. 31, an object point position N of the second lens unit V becomes far, and a movement amount of the second lens unit V for the magnification is increased as shown in the equation (p-2), so that a size of the entire lens system increases.

In addition, if f1/fw is smaller than the lower limit of the conditional expression (1), it is advantageous for achieving a small size of the entire system. However, the focal length f1 becomes too small, and hence a curvature of the surface of the lens element constituting the first lens unit F becomes high. As a result, it becomes difficult to compensate for, in particular, distortion and astigmatism at the wide angle end, and spherical aberration and axial chromatic aberration at the telephoto end.

The conditional expression (2) defines an imaging magnification $\beta vw$ of the second lens unit V at the wide angle end, so as to specify a condition for achieving a wide field angle and a small size and weight.

If $\beta vw$ is greater than the upper limit of the conditional expression (2), it becomes difficult to achieve a wide field angle as shown in the equation (o-1).

In addition, if $\beta vw$ is smaller than the lower limit of the conditional expression (2), it is advantageous for achieving a wide field angle. However, as illustrated in FIG. 31, an object point position N of the second lens unit V becomes far, and a movement amount mv of the second lens unit V accompanying the magnification increases as shown in the equation (p-2), so that a size of the entire lens system is increased.

The conditional expression (3) defines an imaging magnification $\beta r$ of the fourth lens unit R so as to specify a condition for achieving a wide field angle, a small size and weight, and a large aperture.

FIG. 32 illustrates a conceptual diagram of an optical location of the fourth lens unit R. SP denotes a stop, IP denotes an image plane, O denotes an object point position of the fourth lens unit R, S denotes an object distance of the fourth lens unit R, and S' denotes a distance from the fourth lens unit R to the image plane.

If $\beta r$ is greater than the upper limit of the conditional expression (3), the inclination of an off-axial ray on the object side of the stop SP increases at the wide angle end so that a height of the off-axial ray increases. Therefore, the front subunit F1a and the effective diameter of the variable apex angle prism X are increased, so that it becomes difficult to achieve a small size and weight.

In addition, if $\beta r$ is smaller than the lower limit of the conditional expression (3), it becomes difficult to achieve a wide field angle as shown in the equation (o-1). In addition, as shown in the equation (q), the object point position O of the fourth lens unit R becomes near as illustrated in FIG. 32, and a height of the axial ray entering the fourth lens unit R increases so that a size of the fourth lens unit R is increased.

As described above, according to the present invention, a structure of the entire system, an arrangement of the refractive power, and the like are set appropriately when the variable apex angle prism is disposed in the first lens unit as described above. Thus, it is possible to obtain the zoom lens system with a small size and weight having a wide field angle, a high zoom ratio, a large aperture and good optical performance even when the image stabilization function is activated.

Note that at least one of the following structures is preferably satisfied in the present invention.

The first lens unit includes the front subunit that does not move for focusing and has a negative refractive power, the middle subunit that moves during the focusing and has a positive refractive power, and the rear subunit that does not move for the focusing and has a positive refractive power.

This arrangement of optical powers of the first lens unit F enables to achieve the small size and weight of the variable apex angle prism X and the entire lens system. In other words, if the first lens unit F has the structure of a so-called retrofocus type arranging lens units (subunits) having negative, positive, and positive refractive powers in this order from the object side to the image side, the rear principal point position of the first lens unit F can be set on the image side with respect to the last surface of the first lens unit F.

As a result, the height of the off-axial ray entering the variable apex angle prism X and the front subunit F1a at the wide angle end can be decreased as illustrated in FIG. 29, and hence the small size and weight can be achieved. In addition, a so-called front lens three-unit inner focus system is adopted so that the middle subunit F1b is moved during focusing, and hence the aberration variations accompanying the focusing, in particular, the spherical aberration variation and the axial chromatic aberration variation can be suppressed at the telephoto end.

The variable apex angle prism is disposed between the middle subunit and the rear subunit or in the rear subunit.

The optical location of the variable apex angle prism X in the first lens unit F is defined in this way, whereby the diameter of the variable apex angle prism X is decreased so that the small size and weight of the entire lens system can be achieved. If the variable apex angle prism X is disposed on the object side of the middle subunit F1b, an effective beam diameter is increased particularly at the wide angle end as illustrated in FIG. 29. Therefore, the size of the variable apex angle prism X is increased.

In addition, if the variable apex angle prism X is disposed on the image side of the rear subunit F1c, a dead space is necessary for the first lens unit F and the second lens unit V. The height of the off-axial ray of the first lens unit F is increased at the wide angle end, and hence the size of the first lens unit F is increased.

The first lens unit F includes at least two negative lens elements and at least two positive lens elements on the object side of the variable apex angle prism.

The lens structure of the first lens unit F on the object side of the variable apex angle prism X is defined in this way. Thus, high performance is achieved over the entire zoom range (total magnification range) and the entire object distance range (entire focus range) even when the image stabilization function is activated.

In order to suppress the decentering aberration when the image stabilization function is activated, it is necessary to set appropriately the share values of the aberration coefficients of the lens units disposed on the object side of the variable apex angle prism X, and the conversion inclination angle of the axial ray and the off-axial ray.

Therefore, it is necessary to set appropriately the lens structure and the power arrangement. If the structure of the first lens unit F is out of the structure described above, it becomes difficult to maintain the optical performance in the reference state and to compensate appropriately for the various aberrations such as the primary image stabilization coma when the image stabilization function is activated.

Note that, in the zoom lens system of the present invention, one or more conditions among the following conditions may be satisfied.

$$-1.6 < f1a/f1 < -1.0 \quad (4)$$

$$1.2 < \beta 1b < 6.8 \quad (5)$$

$$0.2 < f1/ft < 0.5 \quad (6)$$

$$0.4 < Fno \cdot f1/ft < 3.0 \quad (7)$$

$$1.3 < Nx < 2 \quad (8)$$

$$30 < vx < 200 \quad (9)$$

$$0.01 < dx/Dx < 0.5 \quad (10)$$

Here, f1a is a focal length of the front subunit F1a, and β1b is an imaging magnification of the middle subunit F1b when an infinite object is in focus. Further, f1 is the same as f1 in the conditional expression (1), which denotes a focal length of the first lens unit F when an infinite object is in focus.

In addition, Fno denotes an f-number at the telephoto end and ft denotes a focal length of the entire system at the telephoto end.

In addition, Nx denotes a refractive index of a deformable medium of the variable apex angle prism X, vx denotes the Abbe number of the deformable medium of the variable apex angle prism X. Further, dx denotes a thickness in the optical axis direction of the deformable medium in the reference state. Further, Dx denotes an effective diameter of the variable apex angle prism X.

Here, the reference state means the state where the prism apex angle is O degrees (the state where two parallel flat plates are parallel to each other).

Next, a technical meaning of the above-mentioned conditional expressions is described.

The conditional expression (4) defines a ratio of a focal length of the front subunit F1a to a focal length of the first lens unit F, and the conditional expression (5) defines an imaging magnification of the middle subunit F1b, so as to specify a condition for achieving both a wide field angle and high performance.

The conditional expression (4) defines a ratio of a focal length f1a of the front subunit F1a to a focal length f1 of the first lens unit F, so as to achieve both a wide field angle and high performance. The focal length f1 is expressed by the following equation.

$$f1 = f1a \times \beta 1b \times \beta 1c \quad (r)$$

Where f1a denotes a focal length of the front subunit F1a, β1b denotes an imaging magnification of the middle subunit F1b, and β1c denotes an imaging magnification of the rear subunit F1c.

IF f1a/f1 is greater than the upper limit of the conditional expression (4), a curvature of the surface of the lens element constituting the front subunit F1a increases, so that it becomes difficult to compensate for distortion and astigmatism at the wide angle end in the reference state. In addition, it becomes difficult to compensate appropriately for the image stabilization aberrations including primary image stabilization coma.

In addition, if f1a/f1 is smaller than the lower limit of the conditional expression (4), it becomes difficult to achieve a wide field angle as shown in the equation (r). In addition, the movement amount of the middle subunit F1b for focusing increases, and it becomes difficult to achieve a small size and weight. Further, it becomes difficult to set the rear principal point position of the first lens unit F on the image side, and a size of the first lens unit F is increased.

The conditional expression (5) defines the imaging magnification of the middle subunit F1b, so as to specify a condition for achieving a small size and weight as well as high performance when the image stabilization function is activated.

IF β1b is greater than the upper limit of the conditional expression (5), a curvature of the surface of the lens element of the middle subunit F1b increases. Therefore, it becomes difficult to compensate for various aberrations accompanying focusing, in particular spherical aberration at the telephoto end.

IF β1b is smaller than the lower limit of the conditional expression (5), a movement amount of the middle subunit F1b for focusing increases, and it becomes difficult to achieve a small size and weight.

The conditional expression (6) defines a ratio of the focal length of the first lens unit F to the focal length of the entire system at the telephoto end, so as to specify a condition for achieving both high zooming factor and high performance.

If f1/ft is greater than the upper limit of the conditional expression (6), the object point position N of the second lens unit V becomes far as illustrated in FIG. 31. Therefore, the movement amount of the second lens unit V accompanying the magnification increases as shown in the equation (p-2), and hence the size of the entire lens system is increased.

If f1/ft is smaller than the lower limit of the conditional expression (6), a magnification ratio of the spherical aberration, the axial chromatic aberration and the like generated in the first lens unit F by the variable magnification lens group increases at the telephoto end, which makes it difficult to achieve high performance.

The conditional expression (7) defines the f-number Fno of the entire system at the telephoto end and a ratio of the focal length of the first lens unit F and the focal length of the entire system at the telephoto end, so as to specify a condition for achieving both the large aperture at the telephoto end and the small size and weight.

If Fno·f1/ff is greater than the upper limit of the conditional expression (7), the f-number of the entire system at the telephoto end increases and hence it becomes difficult to achieve the large aperture.

If Fno·f1/ff is smaller than the lower limit of the conditional expression (7), an effective diameter of the rear subunit F1c increases for securing the f-number of the entire system at the telephoto end. Therefore, it becomes difficult to achieve the small size and weight.

The conditional expressions (8) to (10) define a characteristic, a size and the like of the variable apex angle prism X incorporated in the zoom lens system so as to specify conditions for reducing occurrence of the decentering aberration when the image stabilization function is activated with the small size and weight.

The upper limits of the conditional expressions (8) and (9) define the upper limits of the refractive index and the Abbe number of the medium that can endure the use for the variable apex angle prism X.

If Nx and vx are smaller than the lower limits of the conditional expressions (8) and (9), respectively, it becomes difficult to maintain the optical performance in the reference state and to compensate for the primary image stabilization chromatic aberration.

If dx/Dx is greater than the upper limit of the conditional expression (10), the center thickness of the variable apex angle prism X increases so that sizes of the variable apex angle prism X and the entire first lens unit F are increased.

If dx/Dx is smaller than the lower limit of the conditional expression (10), the center thickness of the variable apex angle prism X decreases, which is advantageous for downsizing. However, the maximum variable prism apex angle amount decreases so that an appropriate effect of the image stabilization cannot be obtained.

Further, in each embodiment, it is more preferable to set numeric ranges of the conditional expressions described above as follows.

$$4.3 < f1/fw < 5.4 \quad (1a)$$

$$-0.35 < \beta vw < -0.26 \quad (2a)$$

$$-1.9 < \beta r < -1.6 \quad (3a)$$

$$-1.6 < f1a/f1 < -1.3 \quad (4a)$$

$$1.5 < \beta 1b < 6.3 \quad (5a)$$

$$0.27 < f1/ft < 0.42 \quad (6a)$$

$$0.40 < Fno \cdot f1/ft < 2.10 \quad (7a)$$

$$1.4 < Nx < 1.8 \quad (8a)$$

$$50 < vx < 80 \quad (9a)$$

$$0.05 < dx/Dx < 0.25 \quad (10a)$$

The zoom lens system of each embodiment satisfies the various conditions described above so as to appropriately compensate for the aberration over the entire zoom range and the entire focus range in the reference state and in the case where the image stabilization function is activated, thereby obtaining high optical performance.

In particular, according to each embodiment, the entire system has a small size and weight. The zoom ratio is approximately 12 to 20, the field angle at the wide angle end is approximately 60 to 80 degrees, the f-number at the wide angle end is approximately 1.8 to 2.7, and the f-number at the telephoto end is approximately 3.8 to 4.8. Thus, it is possible to provide the zoom lens system that can obtain a high quality image over the entire zoom range and the entire focus range even when the image stabilization function is activated.

Next, features of the lens structures in Numerical Embodiments 1 to 4 corresponding to Embodiments 1 to 4 are described.

Numerical Embodiment 1

FIG. 1 is a lens cross section at the wide angle end according to Numerical Embodiment 1 of the present invention.

In Numerical Embodiment 1, the zoom ratio (magnification ratio) is fifteen, the shooting field angle (field angle) 2ω at the wide angle end is 69.02 degrees and the f-number is 2.5 to 4.6.

Hereinafter, the first surface to the twenty-second surface counted from the object side constitute the first lens unit F that has a positive refractive power and does not move for zooming (magnification). The first surface to the sixth surface constitute the lens unit (front subunit) F1a that has a negative refractive power and does not move for focusing.

The seventh surface and the eighth surface constitute the lens unit (middle subunit) F1b that has a positive refractive power and moves from the infinite object to the object in close proximity toward the image plane side. A close-up shooting distance is 0.8 m in Numerical Embodiment 1 (where the value is displayed with "mm", and the same is true in the following description). The ninth surface to the twenty-second surface constitute the lens unit (rear subunit) F1c that has a positive refractive power and does not move for focusing. The twenty-third surface to the thirty-second surface constitute the variator (second lens unit) V having a negative refractive power for the magnification, and the variator V moves monotonously on the optical axis toward the image plane side so that the magnification from the wide angle end to the telephoto end can be performed.

The thirty-third surface to the thirty-fifth surface constitute the compensator (third lens unit) C having an action of compensating for a variation of the image point position accompanying the magnification, which moves on the optical axis along a locus convex to the object side in a non-linear manner. The variator V and the compensator C constitute a magnification system (variable magnification lens group).

SP (36) denotes the stop (aperture stop). The thirty-seventh surface to the forty-ninth surface have an imaging action and constitute the relay lens (fourth lens unit) R that has a positive refractive power and does not move for zooming. The fiftieth surface to the fifty-second surface are a color separation prism, an optical filter and the like, which are illustrated as the glass block P in the drawing.

Next, the variable apex angle prism X in this embodiment is described. The variable apex angle prism X corresponds to the twelfth surface to the fifteenth surface, which is disposed between the rear subunit front part F1c1 and the rear subunit rear part F1c2 of the rear subunit F1c. In addition, the variable apex angle prism X is constituted by a parallel flat glass plate, a medium, and a parallel flat glass plate disposed in this order from the object side as described above.

In Numerical Embodiment 1, if a deflection angle (prism apex angle) of the variable apex angle prism X accompanying the image stabilization is 0.3 degrees, a compensation field angle of the ray at the telephoto end is 0.2 degrees.

Numerical Embodiment 2

FIG. 8 is a lens cross section at the wide angle end according to Numerical Embodiment 2.

In Numerical Embodiment 2, the zoom ratio is fifteen, the field angle $2\omega$ at the wide angle end is 69.02 degrees and the f-number is 2.5 to 4.6.

Hereinafter, the first surface to the twenty-second surface counted from the object side constitute the first lens unit F that has a positive refractive power and does not move for zooming.

The first surface to the sixth surface constitute the lens unit (front subunit) F1a that has a negative refractive power and does not move for focusing. The seventh surface and the eighth surface constitute the lens unit (middle subunit) F1b that has a positive refractive power and moves from the infinite object to the object in close proximity toward the image plane side.

A close-up shooting distance is 0.8 m in Numerical Embodiment 2. The ninth surface to the twenty-second surface constitute the lens unit (rear subunit) F1c that has a positive refractive power and does not move for focusing. The twenty-third surface to the thirty-second surface constitute the variator (second lens unit) V having a negative refractive power for the magnification, and the variator V moves monotonously on the optical axis toward the image plane side so that the magnification from the wide angle end to the telephoto end can be performed.

The thirty-third surface to the thirty-fifth surface constitute the compensator (third lens unit) C having an action of compensating for a variation of the image point position accompanying the magnification, which moves on the optical axis along a locus convex to the object side in a non-linear manner. The variator V and the compensator C constitute a magnification system. SP (36) denotes the stop.

The thirty-seventh surface to the forty-ninth surface have an imaging action and constitute the relay lens (fourth lens unit) R that has a positive refractive power and does not move for zooming. The fiftieth surface to the fifty-second surface are a color separation prism, an optical filter and the like, which are illustrated as the glass block P in the figure.

The variable apex angle prism X corresponds to the twelfth surface to the fifteenth surface, which is disposed at a position in the rear subunit F1c similar to that of Numerical Embodiment 1. In addition, the structure of the variable apex angle prism X is similar to that of Numerical Embodiment 1.

In Numerical Embodiment 2, if a deflection angle of the variable apex angle prism X accompanying the image stabilization is 0.28 degrees, a compensation field angle at the telephoto end is 0.2 degrees.

Numerical Embodiment 3

FIG. 15 is a lens cross section at the wide angle end of Numerical Embodiment 3.

In Numerical Embodiment 3, the zoom ratio is fourteen, the field angle $2\omega$ at the wide angle end is 65.82 degrees and the f-number is 2.0 to 4.0. The first surface to the twenty-second surface constitute the first lens unit F that has a positive refractive power and does not move for zooming. The first surface to the sixth surface constitute the lens unit (front subunit) F1a that has a negative refractive power and does not move for focusing.

The seventh surface and the eighth surface constitute a lens unit (middle subunit) F1b that has a positive refractive power and moves from the infinite object to the object in close proximity toward the image plane side. A close-up shooting distance is 0.8 m in Numerical Embodiment 3. The thirteenth surface to the twenty-second surface constitute the lens unit (rear subunit) F1c that has a positive refractive power and does not move for focusing.

The twenty-third surface to the thirty-second surface constitute the variator (second lens unit) V having a negative refractive power for the magnification, and the variator V moves monotonously on the optical axis toward the image plane side so that the magnification from the wide angle end to the telephoto end can be performed.

The thirty-third surface to the thirty-fifth surface constitute the compensator (third lens unit) C having an action of compensating for a variation of the image point position accompanying the magnification, which moves on the optical axis along a locus convex to the object side in a non-linear manner. The variator V and the compensator C constitute a magnification system. SP (36) denotes a stop. The thirty-seventh surface to the fifty-second surface have an imaging action and constitute the relay lens (fourth lens unit) R that has a positive refractive power and does not move for zooming.

The fifty-third surface to the fifty-fifth surface are a color separation prism, an optical filter and the like, which are illustrated as the glass block P in the figure.

The variable apex angle prism X corresponds to the ninth surface to the twelfth surface, which is disposed between the middle subunit F1b and the rear subunit F1c. The structure of the variable apex angle prism X is similar to that of Numerical Embodiment 1.

In Numerical Embodiment 3, if a deflection angle of the variable apex angle prism X accompanying the image stabilization is 0.33 degrees, a compensation field angle at the telephoto end is 0.2 degrees.

Numerical Embodiment 4

FIG. 22 is a lens cross section at the wide angle end according to Numerical Embodiment 4 of the present invention.

In Numerical Embodiment 4, the zoom ratio is sixteen, the field angle $2\omega$ at the wide angle end is 72.5 degrees and the f-number is 2.5 to 4.7. The first surface to the twenty-second surface constitute the first lens unit F that has a positive refractive power and does not move for zooming. The first surface to the sixth surface constitute the lens unit (front subunit) F1a that has a negative refractive power and does not move for focusing.

The seventh surface and the eighth surface constitute the lens unit (middle subunit) F1b that has a positive refractive power and moves from the infinite object to the object in close proximity toward the image plane side.

A close-up shooting distance is 0.8 m in Numerical Embodiment 4. The ninth surface to the twenty-second surface constitute the lens unit (rear subunit) F1c that has a positive refractive power and does not move for focusing. The twenty-third surface to the thirty-second surface constitute the variator (second lens unit) V having a negative refractive power for the magnification, and the variator V moves monotonously on the optical axis toward the image plane side so that the magnification from the wide angle end to the telephoto end can be performed.

The thirty-third surface to the thirty-fifth surface constitute the compensator (third lens unit) C having an action of compensating for a variation of the image point position accompanying the magnification, which moves on the optical axis along a locus convex to the object side in a non-linear manner.

The variator V and the compensator C constitute a magnification system. SP (36) denotes the stop. The thirty-seventh surface to the fifty-fourth surface have an imaging action and constitute the relay lens (fourth lens unit) R that has a positive refractive power and does not move for zooming. The fifty-fifth surface to the fifty-seventh surface are a color separation prism, an optical filter and the like, which are illustrated as the glass block P in the drawing.

Next, the variable apex angle prism X in this embodiment is described. The variable apex angle prism X corresponds to the twelfth surface to the fifteenth surface, which is disposed at a position in the rear subunit F1c similar to that of Numerical Embodiment 1. The structure of the variable apex angle prism X is similar to that of Numerical Embodiment 1.

In Numerical Embodiment 4, if a deflection angle of the variable apex angle prism X accompanying the image stabilization is 0.3 degrees, a compensation field angle at the telephoto end is 0.2 degrees.

Numerical Embodiments 1 to 4 corresponding to Embodiments 1 to 4 of the present invention are described below. In each numerical embodiment, i denotes orders of surfaces counted from the object side, ri denotes a curvature radius of the i-th surface counted from the object side, di denotes an interval between the i-th and the (i+1)th surfaces counted from the object side, and ndi and vdi respectively denote a refractive index and an Abbe number of the i-th optical element.

The focal length, the f-number, and the field angle indicate values when the infinite object is in focus. BF indicates an air-equivalent value of a distance between the last lens surface and the image plane.

The last three surfaces constitute a glass block such as a filter. In addition, relationships between the above-mentioned conditional expressions and numerical embodiments are shown in Table 1.

Numerical Embodiment 1

| Surface number | r | d | nd | vd | Effective diameter |
|---|---|---|---|---|---|
| 1 | 94.650 | 2.10 | 1.77250 | 49.6 | 65.22 |
| 2 | 36.752 | 15.97 | | | 55.44 |
| 3 | −190.229 | 1.85 | 1.77250 | 49.6 | 54.91 |
| 4 | 102.000 | 0.09 | | | 54.26 |
| 5 | 61.224 | 6.01 | 1.92286 | 18.9 | 55.10 |
| 6 | 168.668 | 5.02 | | | 54.53 |
| 7 | 660.854 | 4.92 | 1.50137 | 56.4 | 53.75 |
| 8 | −101.149 | 9.99 | | | 53.38 |
| 9 | −143.427 | 8.15 | 1.49700 | 81.5 | 46.06 |
| 10 | −38.29 | 1.60 | 1.71736 | 29.5 | 46.02 |
| 11 | −59.116 | 3.50 | | | 46.86 |
| 12 | ∞ | 2.50 | 1.51633 | 64.1 | 52.00 |
| 13 | ∞ | 5.80 | 1.41650 | 52.2 | 52.00 |
| 14 | ∞ | 2.50 | 1.51633 | 64.1 | 52.00 |
| 15 | ∞ | 3.50 | | | 52.00 |
| 16 | 176.361 | 1.50 | 1.68893 | 31.1 | 44.53 |
| 17 | 40.567 | 7.54 | 1.49700 | 81.5 | 43.46 |
| 18 | 520.175 | 0.15 | | | 43.42 |
| 19 | 83.655 | 5.26 | 1.48749 | 70.2 | 43.42 |
| 20 | −390.81 | 0.15 | | | 43.28 |
| 21 | 56.725 | 6.02 | 1.60311 | 60.6 | 42.85 |
| 22 | −537.545 | (Variable) | | | 42.35 |
| 23 | 98.506 | 1.00 | 1.83481 | 42.7 | 16.42 |
| 24 | 14.784 | 2.97 | | | 14.53 |
| 25 | −36.707 | 0.75 | 1.83481 | 42.7 | 14.37 |
| 26 | 34.012 | 0.84 | | | 14.28 |
| 27 | 24.947 | 3.73 | 1.80518 | 25.4 | 14.61 |
| 28 | −26.633 | 0.41 | | | 14.41 |
| 29 | −20.435 | 0.75 | 1.83481 | 42.7 | 14.33 |
| 30 | 50.127 | 0.99 | | | 14.28 |
| 31 | 54.86 | 1.70 | 1.64769 | 33.8 | 14.49 |
| 32 | −93.515 | (Variable) | | | 14.51 |
| 33 | −31.241 | 0.75 | 1.74320 | 49.3 | 20.39 |
| 34 | 45.029 | 2.88 | 1.80515 | 25.5 | 22.11 |
| 35 | −684.725 | (Variable) | | | 22.68 |
| 36 (Stop) | ∞ | 1.50 | | | 26.20 |
| 37 | 100.728 | 5.74 | 1.51633 | 64.1 | 28.05 |
| 38 | −34.413 | 0.20 | | | 28.65 |
| 39 | 164.84 | 4.21 | 1.50127 | 56.5 | 29.00 |
| 40 | −57.087 | 0.20 | | | 29.00 |
| 41 | 54.714 | 7.48 | 1.50127 | 56.5 | 27.95 |
| 42 | −30.663 | 1.00 | 2.00330 | 28.3 | 27.05 |
| 43 | −217.188 | 40.28 | | | 27.04 |
| 44 | 63.829 | 0.80 | 1.83481 | 42.7 | 21.60 |
| 45 | 25.036 | 6.47 | 1.54814 | 45.8 | 21.09 |
| 46 | −29.016 | 3.21 | | | 20.87 |
| 47 | −88.578 | 3.21 | 1.48749 | 70.2 | 17.82 |
| 48 | −19.574 | 0.80 | 1.88300 | 40.8 | 17.24 |
| 49 | −52.436 | 5.19 | | | 17.12 |
| 50 | ∞ | 33.00 | 1.60859 | 46.4 | 36.00 |
| 51 | ∞ | 13.2 | 1.51633 | 64.2 | 36.00 |
| 52 | ∞ | | | | 36.00 |

| Various data | | | |
|---|---|---|---|
| Zoom Ratio | | 15.00 | |
| | Wide angle | Middle | Telephoto |
| Focal length | 8.00 | 30.98 | 120.00 |
| f-number | 2.50 | 2.50 | 4.60 |
| Field angle | 34.51 | 10.07 | 2.62 |
| Image height | 5.50 | 5.50 | 5.50 |
| Total lens length | 282.85 | 282.85 | 282.85 |
| BF | 41.50 | 41.50 | 41.50 |
| d22 | 0.68 | 33.39 | 47.86 |

-continued

|  |  |  |  |
|---|---|---|---|
| d32 | 50.05 | 11.16 | 5.30 |
| d35 | 4.60 | 10.78 | 2.18 |
| Entrance pupil position | 47.90 | 95.68 | 210.44 |
| Exit pupil position | −217.82 | −217.82 | −217.82 |
| Front principal point position | 55.62 | 122.40 | 266.43 |
| Rear principal point position | −0.86 | −23.84 | −112.86 |

Zoom lens unit data

| Unit | First surface | Focal length | Lens structure length | Front principal point position | Rear principal point position |
|---|---|---|---|---|---|
| 1 | 22 | 42.25 | 94.11 | 56.19 | 23.74 |
| 2 | 32 | −14.00 | 13.15 | 1.25 | −8.50 |
| 3 | 35 | −47.20 | 3.63 | −0.14 | −2.17 |
| 4 | 52 | 42.40 | 126.51 | 30.40 | −110.39 |

| Variable in-focus interval | Infinity | Close proximity (0.8 m from R1 surface) |
|---|---|---|
| d6 | 5.02 | 12.99 |
| d8 | 9.99 | 2.01 |

Numerical Embodiment 2

Surface Data

| Surface number | r | d | nd | vd | Effective diameter |
|---|---|---|---|---|---|
| 1 | 626.617 | 2.10 | 1.69680 | 55.5 | 63.65 |
| 2 | 43.369 | 18.11 |  |  | 55.01 |
| 3 | −164.881 | 1.85 | 1.77250 | 49.6 | 53.42 |
| 4 | 99.926 | 0.13 |  |  | 53.42 |
| 5 | 67.819 | 5.32 | 1.92286 | 18.9 | 54.41 |
| 6 | 173.326 | 5.04 |  |  | 54.06 |
| 7 | 331.002 | 9.87 | 1.50137 | 56.4 | 53.68 |
| 8 | −55.526 | 5.00 |  |  | 53.45 |
| 9 | −61.482 | 7.15 | 1.49700 | 81.5 | 46.93 |
| 10 | −33.919 | 1.60 | 1.71736 | 29.5 | 46.31 |
| 11 | −55.046 | 3.50 |  |  | 46.60 |
| 12 | ∞ | 2.50 | 1.51633 | 64.1 | 52.00 |
| 13 | ∞ | 5.80 | 1.41650 | 52.2 | 52.00 |
| 14 | ∞ | 2.50 | 1.51633 | 64.1 | 52.00 |
| 15 | ∞ | 3.50 |  |  | 52.00 |
| 16 | 158.721 | 1.50 | 1.68893 | 31.1 | 46.33 |
| 17 | 44.817 | 9.45 | 1.43875 | 95.0 | 46.12 |
| 18 | −241.117 | 0.15 |  |  | 46.47 |
| 19 | 76.382 | 5.47 | 1.49700 | 81.5 | 47.33 |
| 20 | 2673.266 | 0.15 |  |  | 47.14 |
| 21 | 53.747 | 6.90 | 1.60311 | 60.6 | 46.36 |
| 22 | −1332.876 | (Variable) |  |  | 45.72 |
| 23 | 42.431 | 1.00 | 1.83481 | 42.7 | 17.46 |
| 24 | 14.175 | 2.99 |  |  | 15.40 |
| 25 | −78.462 | 0.75 | 1.83481 | 42.7 | 15.20 |
| 26 | 25.460 | 0.72 |  |  | 14.76 |
| 27 | 19.320 | 4.00 | 1.80518 | 25.4 | 14.91 |
| 28 | −32.165 | 0.53 |  |  | 14.41 |
| 29 | −21.274 | 0.75 | 1.83481 | 42.7 | 14.28 |
| 30 | 30.511 | 0.95 |  |  | 13.87 |
| 31 | 29.362 | 1.57 | 1.64769 | 33.8 | 14.00 |
| 32 | 112.539 | (Variable) |  |  | 13.88 |
| 33 | −26.486 | 0.75 | 1.74320 | 49.3 | 17.09 |
| 34 | 31.988 | 3.28 | 1.80515 | 25.5 | 18.64 |
| 35 | 4236.863 | (Variable) |  |  | 19.39 |
| 36 (Stop) | ∞ | 1.50 |  |  | 25.89 |
| 37 | 101.596 | 5.79 | 1.51633 | 64.1 | 27.74 |
| 38 | −34.478 | 0.20 |  |  | 28.40 |
| 39 | 238.120 | 4.45 | 1.50127 | 56.5 | 28.80 |
| 40 | −52.150 | 0.20 |  |  | 28.86 |
| 41 | 50.308 | 7.92 | 1.50127 | 56.5 | 27.81 |
| 42 | −30.017 | 1.00 | 2.00330 | 28.3 | 26.80 |
| 43 | −189.622 | 36.95 |  |  | 26.81 |
| 44 | 70.854 | 0.80 | 1.83481 | 42.7 | 21.36 |
| 45 | 24.071 | 6.99 | 1.54814 | 45.8 | 20.85 |
| 46 | −27.976 | 2.35 |  |  | 20.63 |
| 47 | 2059.912 | 3.49 | 1.48749 | 70.2 | 17.90 |
| 48 | −21.315 | 0.80 | 1.88300 | 40.8 | 17.22 |
| 49 | −89.095 | 5.28 |  |  | 16.95 |
| 50 | ∞ | 33.00 | 1.60859 | 46.4 | 36.00 |
| 51 | ∞ | 13.20 | 1.51633 | 64.2 | 36.00 |
| 52 | ∞ |  |  |  | 36.00 |

Various data

Zoom Ratio 15.00

|  | Wide angle | Middle | Telephoto |
|---|---|---|---|
| Focal length | 8.00 | 30.98 | 120.00 |
| f-number | 2.50 | 2.50 | 4.60 |
| Field angle | 34.51 | 10.07 | 2.62 |
| Image height | 5.50 | 5.50 | 5.50 |
| Total lens length | 278.98 | 278.98 | 278.98 |
| BF | 41.41 | 41.41 | 41.41 |
| d22 | 0.72 | 29.25 | 41.80 |
| d32 | 40.93 | 8.71 | 7.20 |
| d35 | 8.60 | 12.29 | 1.25 |
| Entrance pupil position | 44.58 | 84.14 | 178.73 |
| Exit pupil position | −184.27 | −184.27 | −184.27 |
| Front principal point position | 52.25 | 110.11 | 223.43 |
| Rear principal point position | −1.03 | −24.02 | −113.03 |

Zoom lens unit data

| Unit | First surface | Focal length | Lens structure length | Front principal point position | Rear principal point position |
|---|---|---|---|---|---|
| 1 | 22 | 36.10 | 97.58 | 51.96 | 24.22 |
| 2 | 32 | −14.45 | 13.27 | 2.75 | −6.41 |
| 3 | 35 | −38.00 | 4.03 | −0.02 | −2.25 |
| 4 | 52 | 39.54 | 123.92 | 26.56 | −103.42 |

| Variable in-focus interval | Infinity | Close proximity (0.8 m from R1 surface) |
|---|---|---|
| d6 | 5.04 | 5.00 |
| d8 | 7.98 | 2.05 |

Numerical Embodiment 3

Surface Data

| Surface number | r | d | nd | vd | Effective diameter |
|---|---|---|---|---|---|
| 1 | 350.757 | 2.15 | 1.58913 | 61.1 | 66.10 |
| 2 | 40.598 | 16.60 |  |  | 56.09 |
| 3 | −82.360 | 1.85 | 1.58913 | 61.1 | 55.93 |
| 4 | 199.428 | 0.15 |  |  | 56.54 |
| 5 | 80.645 | 4.62 | 1.92286 | 18.9 | 57.53 |
| 6 | 182.066 | 5.15 |  |  | 57.17 |
| 7 | −459.835 | 6.17 | 1.58144 | 40.8 | 56.90 |
| 8 | −78.171 | 8.39 |  |  | 56.84 |
| 9 | ∞ | 2.50 | 1.51633 | 64.1 | 60.00 |
| 10 | ∞ | 5.80 | 1.41650 | 52.2 | 60.00 |

-continued

| | | | | | |
|---|---|---|---|---|---|
| 11 | ∞ | 2.50 | 1.51633 | 64.1 | 60.00 |
| 12 | ∞ | 4.50 | | | 60.00 |
| 13 | 21209.039 | 7.16 | 1.49700 | 81.5 | 48.89 |
| 14 | −61.436 | 1.60 | 1.72047 | 34.7 | 48.66 |
| 15 | −111.094 | 0.20 | | | 49.19 |
| 16 | 557.031 | 1.60 | 1.71736 | 29.5 | 49.57 |
| 17 | 50.140 | 9.71 | 1.49700 | 81.5 | 49.77 |
| 18 | −212.859 | 0.20 | | | 50.10 |
| 19 | 66.094 | 8.39 | 1.49700 | 81.5 | 51.44 |
| 20 | −202.020 | 0.20 | | | 51.20 |
| 21 | 73.707 | 4.30 | 1.69680 | 55.5 | 49.00 |
| 22 | 235.694 | (Variable) | | | 48.33 |
| 23 | 33.153 | 1.00 | 1.83481 | 42.7 | 21.21 |
| 24 | 14.823 | 4.28 | | | 18.59 |
| 25 | −62.166 | 0.75 | 1.83481 | 42.7 | 18.39 |
| 26 | 34.636 | 0.24 | | | 17.92 |
| 27 | 20.894 | 4.45 | 1.78472 | 25.7 | 18.04 |
| 28 | −52.654 | 0.92 | | | 17.45 |
| 29 | −25.006 | 0.75 | 1.88300 | 40.8 | 17.35 |
| 30 | 37.057 | 1.02 | | | 17.04 |
| 31 | 41.002 | 1.68 | 1.78472 | 25.7 | 17.27 |
| 32 | 236.457 | (Variable) | | | 17.22 |
| 33 | −29.356 | 0.75 | 1.75700 | 47.8 | 21.91 |
| 34 | 41.901 | 3.00 | 1.84666 | 23.8 | 24.31 |
| 35 | −4590.352 | (Variable) | | | 24.84 |
| 36 (Stop) | ∞ | 2.00 | | | 30.94 |
| 37 | 331.250 | 4.68 | 1.67003 | 47.2 | 33.07 |
| 38 | −54.688 | 0.20 | | | 33.79 |
| 39 | 188.726 | 5.84 | 1.53172 | 48.8 | 34.98 |
| 40 | −47.948 | 0.20 | | | 35.22 |
| 41 | 78.561 | 9.07 | 1.50127 | 56.5 | 34.10 |
| 42 | −31.884 | 1.40 | 2.00330 | 28.3 | 33.39 |
| 43 | 287.046 | 0.47 | | | 34.10 |
| 44 | 41.291 | 6.35 | 1.64850 | 53.0 | 35.46 |
| 45 | −280.296 | 20.29 | | | 35.14 |
| 46 | 30.205 | 4.88 | 1.48749 | 70.2 | 26.09 |
| 47 | 926.124 | 1.20 | 1.88300 | 40.8 | 24.97 |
| 48 | 23.826 | 6.18 | | | 23.14 |
| 49 | 84.732 | 3.61 | 1.59270 | 35.3 | 23.64 |
| 50 | −99.572 | 5.63 | | | 23.58 |
| 51 | 40.366 | 4.15 | 1.50127 | 56.5 | 23.76 |
| 52 | −335.242 | 5.00 | | | 23.39 |
| 53 | ∞ | 33.00 | 1.60859 | 46.4 | 36.00 |
| 54 | ∞ | 13.20 | 1.51633 | 64.2 | 36.00 |
| 55 | ∞ | (Variable) | | | 36.00 |

Various data

Zoom Ratio 14.00

| | Wide angle | Middle | Telephoto |
|---|---|---|---|
| Focal length | 8.50 | 31.81 | 119.00 |
| f-number | 2.00 | 2.00 | 4.00 |
| Field angle | 32.91 | 9.81 | 2.65 |
| Image height | 5.50 | 5.50 | 5.50 |
| Total lens length | 285.03 | 285.03 | 285.03 |
| BF | 41.67 | 41.67 | 41.67 |
| d22 | 0.74 | 32.18 | 46.57 |
| d32 | 47.00 | 11.04 | 6.97 |
| d35 | 6.87 | 11.39 | 1.07 |
| Entrance pupil position | 48.45 | 95.54 | 199.60 |
| Exit pupil position | −305.00 | −305.00 | −305.00 |
| Front principal point position | 56.72 | 124.11 | 273.29 |
| Rear principal point position | −1.00 | −24.30 | −111.50 |

Zoom lens unit data

| Unit | First surface | Focal length | Lens structure length | Front principal point position | Rear principal point position |
|---|---|---|---|---|---|
| 1 | 22 | 43.02 | 93.74 | 55.33 | 25.56 |
| 2 | 32 | −15.68 | 15.09 | 4.18 | −6.28 |

-continued

| | | | | | |
|---|---|---|---|---|---|
| 3 | 35 | −42.65 | 3.75 | −0.06 | −2.10 |
| 4 | 55 | 45.31 | 127.37 | 36.67 | −112.74 |

| Variable in-focus interval | Infinity | Close proximity (0.8 m from R1 surface) |
|---|---|---|
| d6 | 5.15 | 8.39 |
| d8 | 10.16 | 3.39 |

Numerical Embodiment 4

Surface Data

| Surface number | r | d | nd | vd | Effective diameter |
|---|---|---|---|---|---|
| 1 | 144.917 | 2.15 | 1.72916 | 54.7 | 67.45 |
| 2 | 38.198 | 16.45 | | | 56.55 |
| 3 | −119.059 | 1.85 | 1.77250 | 49.5 | 56.36 |
| 4 | 91.948 | 0.15 | | | 56.58 |
| 5 | 68.573 | 8.09 | 1.92286 | 18.9 | 57.82 |
| 6 | 4302.800 | 2.90 | | | 57.51 |
| 7 | −596.230 | 5.53 | 1.51742 | 52.4 | 56.83 |
| 8 | −92.067 | 7.38 | | | 56.51 |
| 9 | −131.349 | 10.07 | 1.48749 | 70.2 | 50.24 |
| 10 | −35.656 | 1.60 | 1.75520 | 27.5 | 49.51 |
| 11 | −53.175 | 2.96 | | | 50.31 |
| 12 | ∞ | 2.50 | 1.51633 | 64.1 | 52.00 |
| 13 | ∞ | 5.80 | 1.41650 | 52.2 | 52.00 |
| 14 | ∞ | 2.50 | 1.51633 | 64.1 | 52.00 |
| 15 | ∞ | 7.11 | | | 52.00 |
| 16 | −192.114 | 1.60 | 1.71736 | 29.5 | 44.14 |
| 17 | 52.816 | 8.65 | 1.49700 | 81.5 | 44.26 |
| 18 | −152.185 | 0.15 | | | 44.60 |
| 19 | 90.067 | 6.88 | 1.60311 | 60.6 | 46.11 |
| 20 | −138.543 | 0.15 | | | 46.11 |
| 21 | 59.940 | 5.35 | 1.60311 | 60.6 | 44.76 |
| 22 | 611.753 | (Variable) | | | 44.16 |
| 23 | 98.729 | 1.00 | 1.83481 | 42.7 | 17.36 |
| 24 | 15.324 | 3.28 | | | 15.40 |
| 25 | −38.335 | 0.75 | 1.83481 | 42.7 | 15.22 |
| 26 | 70.246 | 1.51 | | | 15.17 |
| 27 | 36.479 | 3.88 | 1.75520 | 27.5 | 15.43 |
| 28 | −21.437 | 0.06 | | | 15.25 |
| 29 | −21.266 | 0.75 | 1.83481 | 42.7 | 15.19 |
| 30 | 30.678 | 2.29 | | | 14.97 |
| 31 | 33.527 | 1.76 | 1.71736 | 29.5 | 15.66 |
| 32 | 1268.673 | (Variable) | | | 15.64 |
| 33 | −30.664 | 0.75 | 1.75700 | 47.8 | 20.88 |
| 34 | 50.523 | 2.35 | 1.84666 | 23.8 | 22.65 |
| 35 | −422.602 | (Variable) | | | 23.02 |
| 36 (Stop) | ∞ | 1.50 | | | 26.82 |
| 37 | 64.652 | 5.74 | 1.51633 | 64.1 | 29.15 |
| 38 | −45.207 | 0.20 | | | 29.61 |
| 39 | 6128.545 | 1.00 | 1.83400 | 37.2 | 29.83 |
| 40 | 41.257 | 6.98 | 1.50127 | 56.5 | 29.98 |
| 41 | −49.211 | 0.20 | | | 30.39 |
| 42 | 66.545 | 8.62 | 1.50127 | 56.5 | 30.50 |
| 43 | −27.715 | 1.00 | 1.83400 | 37.2 | 30.17 |
| 44 | −178.317 | 0.13 | | | 30.76 |
| 45 | 31.915 | 5.12 | 1.48749 | 70.2 | 31.15 |
| 46 | 168.460 | 29.05 | | | 30.62 |
| 47 | 108.388 | 0.80 | 1.83481 | 42.7 | 20.11 |
| 48 | 17.619 | 6.67 | 1.54814 | 45.8 | 19.21 |
| 49 | −30.067 | 2.09 | | | 18.97 |
| 50 | −28.191 | 2.21 | 1.49700 | 81.5 | 17.71 |
| 51 | −19.798 | 0.80 | 1.83481 | 42.7 | 17.62 |
| 52 | −71.571 | 2.43 | | | 18.11 |
| 53 | 107.190 | 3.06 | 1.54814 | 45.8 | 18.70 |
| 54 | −41.438 | 5.00 | | | 18.78 |
| 55 | ∞ | 33.00 | 1.60859 | 46.4 | 36.00 |
| 56 | ∞ | 13.20 | 1.51633 | 64.2 | 36.00 |
| 57 | ∞ | | | | 36.00 |

-continued

Various data

| | Zoom Ratio | | 16.00 | |
|---|---|---|---|---|
| | | Wide angle | Middle | Telephoto |
| Focal length | | 7.50 | 30.00 | 120.00 |
| f-number | | 2.50 | 2.50 | 4.70 |
| Field angle | | 36.25 | 10.39 | 2.62 |
| Image height | | 5.50 | 5.50 | 5.50 |
| Total lens length | | 294.35 | 294.35 | 294.35 |
| BF | | 41.68 | 41.68 | 41.68 |
| d22 | | 0.65 | 35.02 | 49.56 |
| d32 | | 51.23 | 11.07 | 6.43 |
| d35 | | 5.01 | 10.80 | 0.91 |
| Entrance pupil position | | 45.66 | 90.37 | 201.39 |
| Exit pupil position | | −188.15 | −188.15 | −188.15 |
| Front principal point position | | 52.87 | 115.77 | 247.79 |
| Rear principal point position | | 0.01 | −22.49 | −112.49 |

Zoom lens unit data

| Unit | First surface | Focal length | Lens structure length | Front principal point position | Rear principal point position |
|---|---|---|---|---|---|
| 1 | 22 | 40.17 | 99.82 | 55.94 | 27.59 |
| 2 | 32 | −14.72 | 15.27 | 1.01 | −11.23 |
| 3 | 35 | −48.03 | 3.10 | −0.20 | −1.90 |
| 4 | 57 | 41.09 | 128.79 | 27.43 | −105.62 |

| Variable in-focus interval | Infinity | Close proximity (0.8 m from R1 surface) |
|---|---|---|
| d6 | 2.90 | 7.38 |
| d8 | 9.69 | 0.60 |

(Table 1)

TABLE 1

| Conditional Number expression | Numerical Embodiment 1 | Numerical Embodiment 2 | Numerical Embodiment 3 | Numerical Embodiment 4 |
|---|---|---|---|---|
| (1) f1/fw | 5.31 | 4.51 | 5.06 | 5.36 |
| (2) βvw | −0.28 | −0.34 | −0.32 | −0.28 |
| (3) βr | −1.77 | −1.79 | −1.65 | −1.75 |
| (4) f1a/f1 | −1.56 | −1.36 | −1.34 | −1.58 |
| (5) βf1b | 1.62 | 5.00 | 2.27 | 1.77 |
| (6) f1/ft | 0.35 | 0.30 | 0.36 | 0.33 |
| (7) Fno · f1/ft | 1.63 | 1.38 | 1.45 | 1.34 |
| (8) Nx | 1.42 | 1.42 | 1.42 | 1.42 |
| (9) vx | 52.20 | 52.20 | 52.20 | 52.20 |
| (10) dx/Dx | 0.12 | 0.12 | 0.10 | 0.12 |

FIG. 33 is a schematic diagram of a main part of a camera (TV camera system) in which the zoom lens system of each embodiment is used as the image pickup optical system. In FIG. 33, a zoom lens system 101 according to any one of Embodiments 1 to 4 is provided. A camera 124 is also provided. The zoom lens system 101 is detachable from the camera 124. A camera apparatus 125 is constituted by the camera 124 and the zoom lens system 101 attached to the camera 124.

The zoom lens system 101 includes the first lens unit F, a magnification unit (variable magnification lens group) LZ, and the fourth lens unit R for imaging. The first lens unit F includes a lens unit for focusing. The magnification unit LZ includes the second lens unit V that moves on the optical axis for magnification and the third lens unit C that moves on the optical axis for compensating for an image plane variation accompanying the magnification.

SP denotes the aperture stop. The fourth lens unit R includes a front group 4F, a rear group 4B and a lens unit IE that can be inserted and removed in the optical path.

The lens unit IE changes the focal length range of the entire system of the zoom lens system 101.

Drive mechanisms 114 and 115 such as a helicoid or a cam for driving the first lens unit F and the magnification unit LZ in the optical axis direction are provided.

Motors (drive units) 116 to 118 for electrically driving the drive mechanisms 114 and 115 and the aperture stop SP are further provided.

Detectors 119 to 121 such as an encoder, a potentiometer or a photosensor for detecting positions of the first lens unit F and the magnification unit LZ on the optical axis, and a stop diameter of the aperture stop SP are further provided.

The camera 124 includes a glass block 109 corresponding to an optical filter or a color separation prism, and a solid-state image pickup element (photoelectric transducer) 110 such as a CCD sensor or a CMOS sensor for receiving light of a subject image formed by the zoom lens system 101.

In addition, CPUs 111 and 122 for controlling various drives of the camera 124 and the main body of the zoom lens system 101 are provided.

When the zoom lens system according to the present invention is applied to the TV camera as described above, it is possible to realize the camera having high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-132926, filed May 21, 2008, which is hereby incorporated by reference herein in its entirety.

What is claimed is:

1. A zoom lens system, comprising, in order from an object side to an image side:
   a first lens unit that does not move for zooming and has a positive optical power;
   a second lens unit that moves during the zooming and has a negative optical power;
   a third lens unit that moves during the zooming and has a negative optical power; and
   a fourth lens unit that does not move for the zooming and has a positive optical power,
   wherein the first lens unit comprises a variable apex angle prism disposed on the image side of at least one lens element; and
   wherein the following conditions are satisfied:

$4.3 < f1/fw < 10$;

$-0.8 < \beta vw < -0.2$; and $-1.9 < \beta r < -1.4$, where fw denotes a focal length of an entire system at a wide angle end, f1 denotes a focal length of the first lens unit, βvw denotes an imaging magnification of the second lens unit at the wide angle end, and βr denotes an imaging magnification of the fourth lens unit.

2. A zoom lens system according to claim 1, wherein the first lens unit further comprises, in order from the object side to the image side:
   a front subunit that does not move for focusing and has a negative optical power;
   a middle subunit that moves during the focusing and has a positive optical power; and
   a rear subunit that does not move for the focusing and has a positive optical power.

3. A zoom lens system according to claim 2, wherein the variable apex angle prism is disposed between the middle subunit and the rear subunit or disposed in the rear subunit.

4. A zoom lens system according to claim 2, wherein:
   the f1 denotes the focal length of the first lens unit when an infinite object is in focus; and
   the following conditions are satisfied:

$-1.6 < f1a/f1 < -1.0$; and $1.2 < \beta 1b < 6.8$, where $f1a$ denotes a focal length of the front subunit, and $\beta 1b$ denotes an imaging magnification of the middle subunit when the infinite object is in focus.

5. A zoom lens system according to claim 1, wherein the first lens unit further comprises, on the object side of the variable apex angle prism:
   at least two negative lens elements; and
   at least two positive lens elements.

6. A zoom lens system according to claim 1, wherein the following condition is satisfied $0.2 < f1/ft < 0.5$, where ft denotes a focal length of the entire system at a telephoto end.

7. A zoom lens system according to claim 1, wherein the following condition is satisfied $0.4 < Fno \cdot f1/ft < 3.0$, where Fno denotes an f-number at a telephoto end, and ft denotes a focal length of the entire system at the telephoto end.

8. A zoom lens system according to claim 1, wherein the following conditions are satisfied:

$1.3 < Nx < 2$;

$30 < vx < 200$; and $0.01 < dx/Dx < 0.5$, where Nx denotes a refractive index of a deformable medium contained in the variable apex angle prism, vx denotes an Abbe number of the deformable medium, dx denotes a thickness of the deformable medium in an optical axis direction in a reference state, and Dx denotes an effective diameter of the variable apex angle prism.

9. A camera, comprising:
   the zoom lens system according to claim 1; and
   a solid-state image pickup element that receives light of an image formed by the zoom lens system.

* * * * *